United States Patent
Hong

(10) Patent No.: US 11,460,223 B2
(45) Date of Patent: Oct. 4, 2022

(54) GAS HEAT PUMP SYSTEM

(71) Applicant: LG ELECTRONICS INC., Seoul (KR)

(72) Inventor: Seokpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/626,475

(22) PCT Filed: Jan. 11, 2018

(86) PCT No.: PCT/KR2018/000558
§ 371 (c)(1),
(2) Date: Dec. 24, 2019

(87) PCT Pub. No.: WO2019/004546
PCT Pub. Date: Jan. 3, 2019

(65) Prior Publication Data
US 2020/0132349 A1    Apr. 30, 2020

(30) Foreign Application Priority Data
Jun. 26, 2017 (KR) .......... 10-2017-0080585

(51) Int. Cl.
*F25B 41/00* (2021.01)
*F25B 1/04* (2006.01)
(Continued)

(52) U.S. Cl.
CPC ............... *F25B 1/04* (2013.01); *F25B 30/02* (2013.01); *F25B 41/40* (2021.01); *F25B 41/42* (2021.01);
(Continued)

(58) Field of Classification Search
CPC ............................. C21D 2211/001
See application file for complete search history.

(56) References Cited

U.S. PATENT DOCUMENTS 5,676,176 A    10/1997   Usui
2007/0039346 A1*   2/2007   Yano ............ F25B 41/40
                                                      62/295
(Continued)

FOREIGN PATENT DOCUMENTS

EP       1724134 A2 * 11/2006 ......... B60H 1/00885
JP      2001-304116 A    10/2001
(Continued)

OTHER PUBLICATIONS

"35kw 75kw 140kw Industrial Air Cooled Heat Pump Water Modular Chiller with Evi Compressor." Made in China, Jan. 15, 2011, gchvglobal.en.made-in-china.com/product/oBWxjmvYCXpD/China-35kw-75kw-140kw-Industrial-Air-Cooled-Heat-Pump-Water-Modular-Chiller-with-Evi-Compressor.html. (Year: 2011).*

(Continued)

*Primary Examiner* — Jonathan Bradford
(74) *Attorney, Agent, or Firm* — Dentons US LLP

(57) ABSTRACT

A gas heat pump system including an outdoor unit having a compressor, an outdoor heat exchanger, and an expansion device; an indoor unit having an indoor heat exchanger; a refrigerant pipe to connect the outdoor unit and the indoor unit; an engine to combust mixed fuel in which fuel and air are mixed; a coolant tank to store a coolant; a radiator to emit, to an outside, heat which is transferred from the engine to the coolant; and a coolant pipe to connect the coolant tank and the radiator to allow the coolant to circulate therethrough, whereby the gas heat pump system has a cooling capability between 71 kW and 85 kW, the refrigerant is a mixed refrigerant having at least 50% R32, and the refrigerant pipe is a ductile stainless steel pipe having a delta ferrite matrix structure of 1% or less based on grain area.

8 Claims, 22 Drawing Sheets

(51) Int. Cl.
*F25B 30/02* (2006.01)
*F25B 41/40* (2021.01)
*F25B 41/42* (2021.01)
*F25B 9/00* (2006.01)
*F25B 27/02* (2006.01)

(52) U.S. Cl.
CPC ........ *C21D 2211/001* (2013.01); *F25B 9/006* (2013.01); *F25B 27/02* (2013.01); *F25B 2313/02741* (2013.01); *F25B 2327/001* (2013.01); *F25B 2600/2513* (2013.01); *F25B 2700/1933* (2013.01); *F25B 2700/2106* (2013.01)

(56) References Cited

U.S. PATENT DOCUMENTS

| | | | | |
|---|---|---|---|---|
| 2014/0311610 | A1* | 10/2014 | Kwon | F16L 55/0333 138/110 |
| 2015/0275341 | A1* | 10/2015 | Cheney | C22C 38/12 420/12 |
| 2018/0371575 | A1* | 12/2018 | Kang | C21D 8/0226 |

FOREIGN PATENT DOCUMENTS

| | | | |
|---|---|---|---|
| JP | 2010121190 | A | 6/2010 |
| JP | 2012-251767 | A | 12/2012 |
| JP | 6012189 | B2 | 10/2016 |
| KR | 10-2003-0074232 | A | 9/2003 |
| KR | 10-2003-0082387 | A | 10/2003 |
| KR | 20-0397964 | Y1 | 10/2005 |
| KR | 10-2013-0045931 | A | 5/2013 |
| KR | 10-2013-0093297 | A | 8/2013 |
| KR | 10-2014-0026607 | A | 3/2014 |
| KR | 10-1714900 | B1 | 3/2017 |
| KR | 101735007 | B1 | 5/2017 |
| WO | 2016/104974 | A | 6/2016 |

OTHER PUBLICATIONS

Bhadeshia, H.K.D.H., and T. Sourmail. "Stainless Steels." University of Cambridge, Apr. 8, 2017, www.phase-trans.msm.cam.ac.uk/2005/Stainless_steels/stainless.html. (Year: 2017).*

"Overview of Materials for Austenitic and T400 Stainless Steel", Sep. 17, 2008, www.matweb.com/search/DataSheet.aspx?MatGUID=cefecc69eca4419491a8ce46d4013647 AND www.matweb.com/search/DataSheet.aspx?MatGUID=76c67e3dbb45468d8a9268f543656402 . (Year: 2008).*

"Matweb 302." 302 Stainless Steel, Annealed Strip, 2008, http://www.matweb.com/search/DataSheet.aspx?MatGUID=f290e46425d648f6963d16a9a80e63c4. (Year: 2008).*

Anonymous Eco, "Creating Air-Conditioned Comfort Air conditioning System", Creating Air-Conditioned Comfort Air conditioning System, pp. 6-8 (May 2012).

* cited by examiner

FIG. 16
(a)
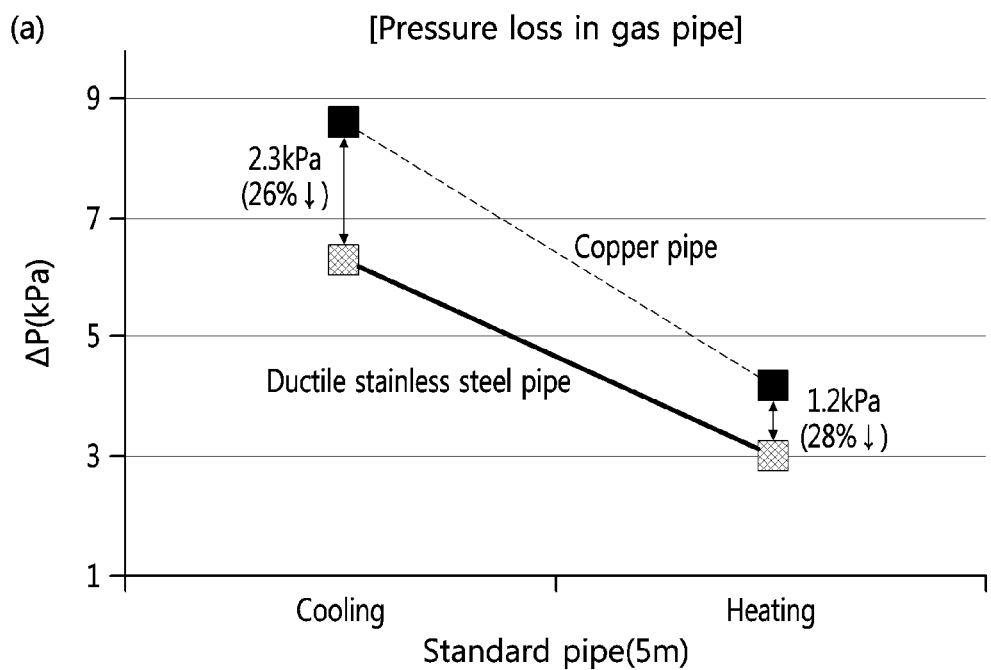
(b)
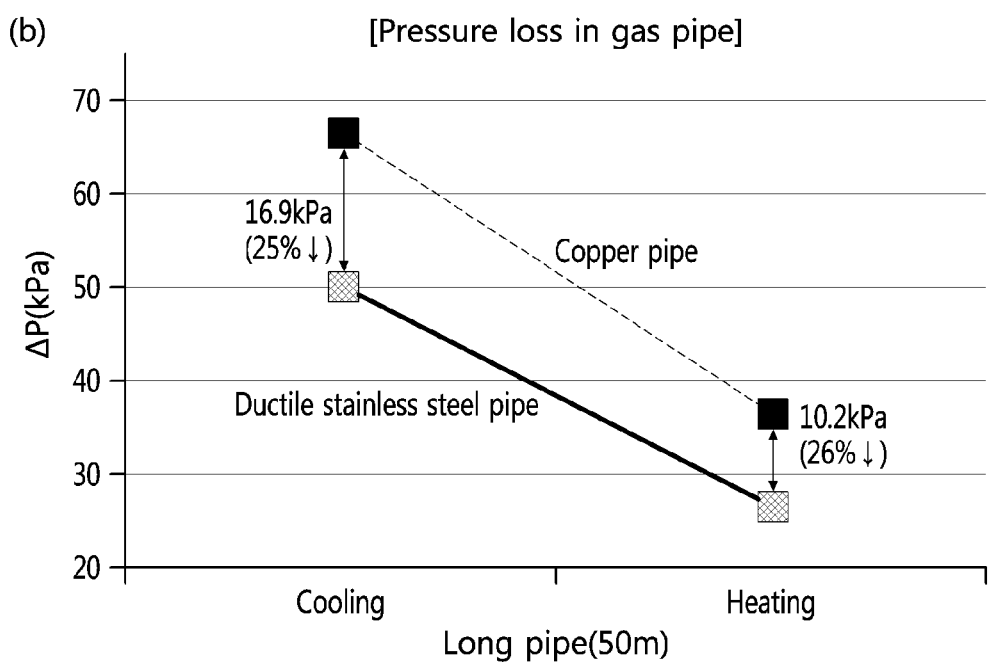

| 5 m standard | Cooling | | Heating | |
|---|---|---|---|---|
| Classification | Copper pipe(Cu) | Ductile stainless steel pipe | Copper pipe(Cu) | Ductile stainless steel pipe |
| Capacity(kW) | 9.36 | 9.45 (100.9%) | 11.28 | 11.31 (100.2%) |
| Power consumption(kW) | 2.07 | 2.06 (100.0%) | 2.55 | 2.55 (100.0%) |
| Efficiency | 4.53 | 4.58 (100.9%) | 4.43 | 4.44 (100.2%) |

(b)

| 50m long pipe | Cooling | | Heating | |
|---|---|---|---|---|
| Classification | Copper pipe(Cu) | Ductile stainless steel pipe | Copper pipe(Cu) | Ductile stainless steel pipe |
| Capacity(kW) | 7.77kW | 8.03 (103.4%) | 8.92 | 9.07 (101.7%) |
| Power consumption(kW) | 2.08kW | 2.08 (100.2%) | 2.54 | 2.53 (99.7%) |
| Efficiency | 3.74 | 3.86 (103.2%) | 3.51 | 3.58 (102.0%) |

Ductile stainless steel pipe    Aluminum pipe    $D_2$ Copper pipe

| Smaple number | Corrosion depth(μm) | | | | | | Average | Maximum | Divation |
|---|---|---|---|---|---|---|---|---|---|
| | 1 | | 2 | | 3 | | | | |
| Measurement position | 1 | 2 | 1 | 2 | 1 | 2 | | | |
| Ductile stainless steel pipe | 8 | 9 | 26 | 25 | 36 | 9 | 19 | 36 | 12 |
| Copper pipe | 16 | 16 | 49 | 8 | 28 | 17 | 22 | 49 | 15 |
| Aluminum pipe | 91 | 64 | 95 | 105 | 104 | 110 | 95 | 110 | 17 |

FIG. 21
(a)
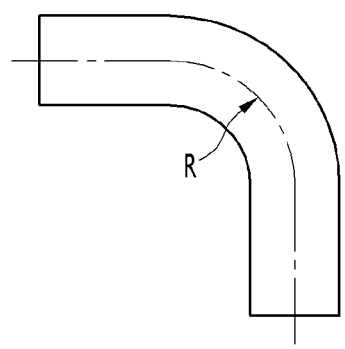
(b)
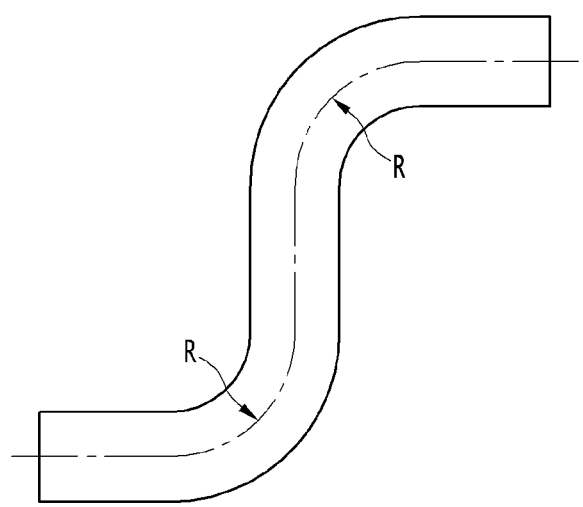

GAS HEAT PUMP SYSTEM

This application is a National Stage Application of International Application No. PCT/KR2018/000558, filed on Jan. 11, 2018, which claims the benefit of Korean Patent Application No. 10-2017-0080585, filed on Jun. 26, 2017, all of which are hereby incorporated by reference in their entirety for all purposes as if fully set forth herein.

TECHNICAL FIELD

The present disclosure relates to a gas heat pump system.

BACKGROUND ART

A gas heat pump system may be defined as a type of air conditioner characterized in that a compressor constituting a refrigeration cycle for cooling or heating is driven not by electricity but by a gas engine.

In detail, the refrigeration cycle includes a compressor for compressing a refrigerant, a condenser for condensing the refrigerant compressed by the compressor, an expansion device for decompressing the refrigerant condensed by the condenser, and an evaporator for evaporating the decompressed refrigerant.

The gas heat pump system includes an engine for generating power by using a mixture of fuel and air (hereinafter, referred to as mixed fuel), an air supply device for supplying the mixed fuel to the engine, and a coolant for cooling the engine while circulating the engine.

The coolant may absorb waste heat of the engine, and the absorbed waste heat may be supplied to a refrigerant circulating in the gas heat pump system to help improve the performance of the system.

In particular, the coolant absorbing waste heat generated by the engine during a heating operation is heat-exchange with an outdoor unit operating as the evaporator, thereby preventing a phenomenon that frost occurs on the surface of the outdoor unit. Therefore, there is an advantage in that a defrosting operation essentially performed in a heating operation of a general refrigeration cycle is not necessary.

In addition, during the cooling operation, when the temperature of the coolant is lower than the temperature of the outdoor unit, the high-temperature coolant flowing along the outdoor unit cools down. Therefore, the condensation temperature is lowered to improve the performance of the system.

Meanwhile, the components constituting the refrigeration cycle, specifically the compressor, the condenser, the expansion device, and the evaporator, are connected to each other by a refrigerant pipe, thereby forming a closed circuit for refrigerant circulation.

In general, a copper (Cu) pipe made of a copper material is widely used as the refrigerant pipe. However, the copper pipe has some limitations as follows.

First, when the copper pipe is used in a total heat exchanger in which water is used as a refrigerant, scales are accumulated on an inner circumferential surface of the pipe to deteriorate reliability of the pipe. That is, when the scales are accumulated on the inner circumferential surface of the copper pipe, it is necessary to perform a cleaning process for cleaning the inner circumferential surface of the pipe or a pipe replacement process.

Second, there is a disadvantage that the copper pipe does not have sufficient pressure resistance characteristics for withstanding a high pressure. Particularly, when the copper pipe is applied to a refrigerant circulation cycle to which a refrigerant compressed at a high pressure by a compressor, i.e., a new refrigerant such as R410a, R22, and R32 is applied, as an operating time of the refrigerant cycle is accumulated, the cooper pipe may not withstand the high pressure and thus be damaged.

Third, since the copper pipe has a small stress margin value for withstanding a pressure of the refrigerant in the pipe, it is vulnerable to vibration transmitted from the compressor. For this reason, to absorb the vibration transmitted to the copper pipe and the resultant noise, the pipe is lengthened in length and disposed to be bent in x, y, and z axis directions.

As a result, since an installation space for accommodating the copper pipe is not sufficient in an outdoor unit of an air conditioner or a washing machine using a heat pump, it is difficult to install the pipe.

Also, since copper prices are relatively high in the market, and price fluctuations are so severe, it is difficult to use the copper pipe.

In recent years, to solve these limitations, a new method for replacing the copper pipe with a stainless steel pipe is emerging.

The stainless steel pipe is made of a stainless steel material, has strong corrosion resistance when compared to the copper pipe, and is less expensive than that of the copper pipe. Also, since the stainless steel pipe has strength and hardness greater than those of the copper pipe, vibration and noise absorption capability may be superior to that of the copper pipe.

Also, since the stainless steel pipe has pressure resistance characteristics superior to those of the copper pipe, there is no risk of damage even at the high pressure.

However, since the stainless steel pipe according to the related art has excessively high strength and hardness when compared to the copper pipe, it is disadvantageous to an expansion operation for pipe connection or a pipe bending operation. Particularly, the pipe constituting the refrigerant cycle may be disposed in a shape that is bent at a specific curvature at a specific point. However, when the stainless steel pipe according to the related art is used, it is impossible to bend the pipe.

DISCLOSURE OF THE INVENTION

Technical Problem

Embodiments provide a gas heat pump system provided with a refrigerant pipe which is improved in workability by securing ductility at a level of a copper pipe.

Embodiments also provide a gas heat pump system provided with a refrigerant pipe having strength and hardness equal to or higher than those of a copper pipe.

Embodiments also provide a gas heat pump system which is capable of preventing a refrigerant pipe from being corroded by a refrigerant pressure condition inside the pipe or an environmental condition outside the pipe.

Embodiments also provide a gas heat pump system provided with a refrigerant pipe which is capable of maintaining a critical pressure above a predetermined level even if the pipe is reduced in thickness.

Embodiments also provide a gas heat pump system provided with a refrigerant pipe which increases in inner diameter to reduce a pressure loss of a refrigerant flowing in the pipe.

Embodiments also provide a gas heat pump system provided with a refrigerant pipe having improved vibration absorption capability. In particular, embodiments provide a gas heat pump system which is capable of reducing a length of a refrigerant pipe by allowing the refrigerant pipe to easily absorb vibration transferred from a compressor.

Embodiments also provide a gas heat pump system which is capable of determining an outer diameter of a refrigerant pipe according to air conditioning capacity determined based on compressor capacity.

Embodiments also provide a gas heat pump system which is capable of determining the inner diameter of the refrigerant pipe based on the thickness of the pipe determined according to the determined outer diameter of the refrigerant pipe and the type of the refrigerant.

Technical Solution

In order to achieve the above object, a gas heat pump system according to an embodiment of the present disclosure may include: an outdoor unit comprising a compressor, an outdoor heat exchanger, and an expansion device; an indoor unit comprising an indoor heat exchanger; a refrigerant pipe configured to connect the outdoor unit and the indoor unit so as to allow a refrigerant to circulate through the outdoor unit and the indoor unit; an engine configured to combust mixed fuel in which fuel and air are mixed so as to provide power for driving the compressor; a coolant tank configured to store a coolant for cooling the engine; a coolant pump configured to allow the coolant stored in the coolant tank to forcibly flow; a radiator configured to emit, to an outside, heat which is transferred from the engine to the coolant; and a coolant pipe configured to connect the coolant tank, the coolant pump, and the radiator so as to allow the coolant to circulate therethrough, wherein the gas heat pump system may have a cooling capability between 71 kW and 85 kW, a mixed refrigerant containing R32 of 50% or more may be used as the refrigerant, and the refrigerant pipe may include a ductile stainless steel pipe having a delta ferrite matrix structure of 1% or less on a basis of a grain area.

In addition, a filling amount of the refrigerant may be 10.5 kg.

In addition, the ductile stainless steel pipe may have an austenite matrix structure and an average diameter of μm to 60 μm, and an American Society for Testing and Material (ASTM) grain size No. of the ductile stainless steel pipe may be 5.0 to 7.0.

In addition, the refrigerant pipe may include a suction pipe configured to guide suction of the refrigerant to the compressor, and the suction pipe may have an outer diameter of 25.40 mm and an inner diameter of 24.10 mm.

In addition, the suction pipe may be provided with a wrinkle part, and the wrinkle part may include a plurality of mountain portions and a plurality of valley portions, which are alternately disposed.

In addition, the refrigerant pipe may include a discharge pipe configured to guide discharge of the refrigerant from the compressor, and the discharge pipe may have an outer diameter of 19.05 mm and an inner diameter of 18.07 mm.

In addition, the discharge pipe may be provided with a wrinkle part, and the wrinkle part may include a plurality of mountain portions and a plurality of valley portions, which are alternately disposed.

In addition, the compressor may be an inverter scroll compressor.

Advantageous Effects

The first to sixth embodiments of the present disclosure constituting the configurations as described above have the following effects.

It is possible to improve the operation efficiency of the gas heat pump system by using the refrigerant corresponding to the cooling capacity of the gas heat pump system.

In detail, the austenite type stainless steel pipe may be applied to secure ductility at the level of the copper pipe when compared to the stainless steel pipe according to the related art, and thus, the bent stainless steel pipe may be applied to the refrigerant circulation cycle. That is, the degree of freedom of forming the refrigerant pipe may increase when compared to the stainless steel pipe according to the related art. Also, the relatively inexpensive ductile stainless steel pipe may be used without using expensive copper pipe.

Also, since the ductile stainless steel pipe according to the embodiment has the strength and the hardness greater than those of the copper pipe while having the ductility at the level of the copper pipe, the pressure resistance may be remarkably superior to that of the copper pipe, and various kinds of new refrigerants having the high saturated vapor pressure may be used in the refrigerant cycle. There is an advantage that the so-called degree of freedom of the refrigerant increases.

Also, since the stainless steel pipe having the strength and the hardness greater than those of the copper pipe has a stress margin greater than that of the copper pipe, the vibration absorption capability may be remarkably superior to that of the copper pipe. That is to say, in case of the stainless steel pipe, it is unnecessary to lengthen the pipe so as to absorb the vibration and the noise, it may be unnecessary to bend the pipe several times. Thus, it may be easy to secure the spaced for installing the refrigerant cycle, and the manufacturing cost may be reduced by reducing the length of the pipe.

Also, since the ductility of the ductile stainless steel pipe according to the embodiment is improved, the workability of the pipe may increase. Also, since the ductile stainless steel pipe has corrosion resistance superior to that of the copper pipe, the lifespan of the pipe may be prolonged.

Also, since the suction pipe disposed adjacent to the compressor may be improved in strength to prevent the suction pipe from being vibrated and damaged. Also, since the ductility of the suction pipe increases, the suction pipe may be worked (bent) and thus easily installed in the limited space.

Also, since the suction pipe constituting the ductile stainless has the strength greater than that of the copper pipe while securing the ductility at the level of the copper pipe, the pipe may be reduced in thickness. That is, even if the pipe has a thickness less than that of the copper pipe, the limit pressure of the pipe may be maintained to reduce the thickness of the pipe.

Also, since the discharge pipe disposed at the discharge side of the compressor to allow the high-pressure refrigerant to flow therethrough may be improved in strength to prevent the discharge pipe from being vibrated and damaged. Also, since the ductility of the discharge pipe increases, the suction pipe may be worked (bent) and thus easily installed in the limited space.

Also, since the discharge pipe constituting the ductile stainless has the strength greater than that of the copper pipe while securing the ductility at the level of the copper pipe, the pipe may be reduced in thickness. That is, even if the pipe has a thickness less than that of the copper pipe, the limit pressure of the pipe may be maintained to reduce the thickness of the pipe.

As a result, the suction/discharge pipes may increase in inner diameter under the same outer diameter as the copper pipe, and the pressure loss of the refrigerant flowing through the pipe may be reduced due to the increase of the inner diameter. As the pressure loss within the pipe decreases, the flow rate of the refrigerant may increase to improve the coefficient of performance (COP) of the refrigerant cycle.

BRIEF DESCRIPTION OF THE DRAWINGS

FIG. 16 is a graph illustrating result values obtained through a test for comparing pressure losses within the pipes when each of the ductile stainless steel pipe according to an embodiment and the copper pipe according to the related art is used as a gas pipe.

FIG. 17 is a test result table illustrating performance of the ductile stainless steel pipe according to an embodiment and the copper pipe according to the related art.

FIG. 21 is view illustrating a shape in which the ductile stainless steel pipe is bent according to an embodiment.

BEST MODE

Figure 1:
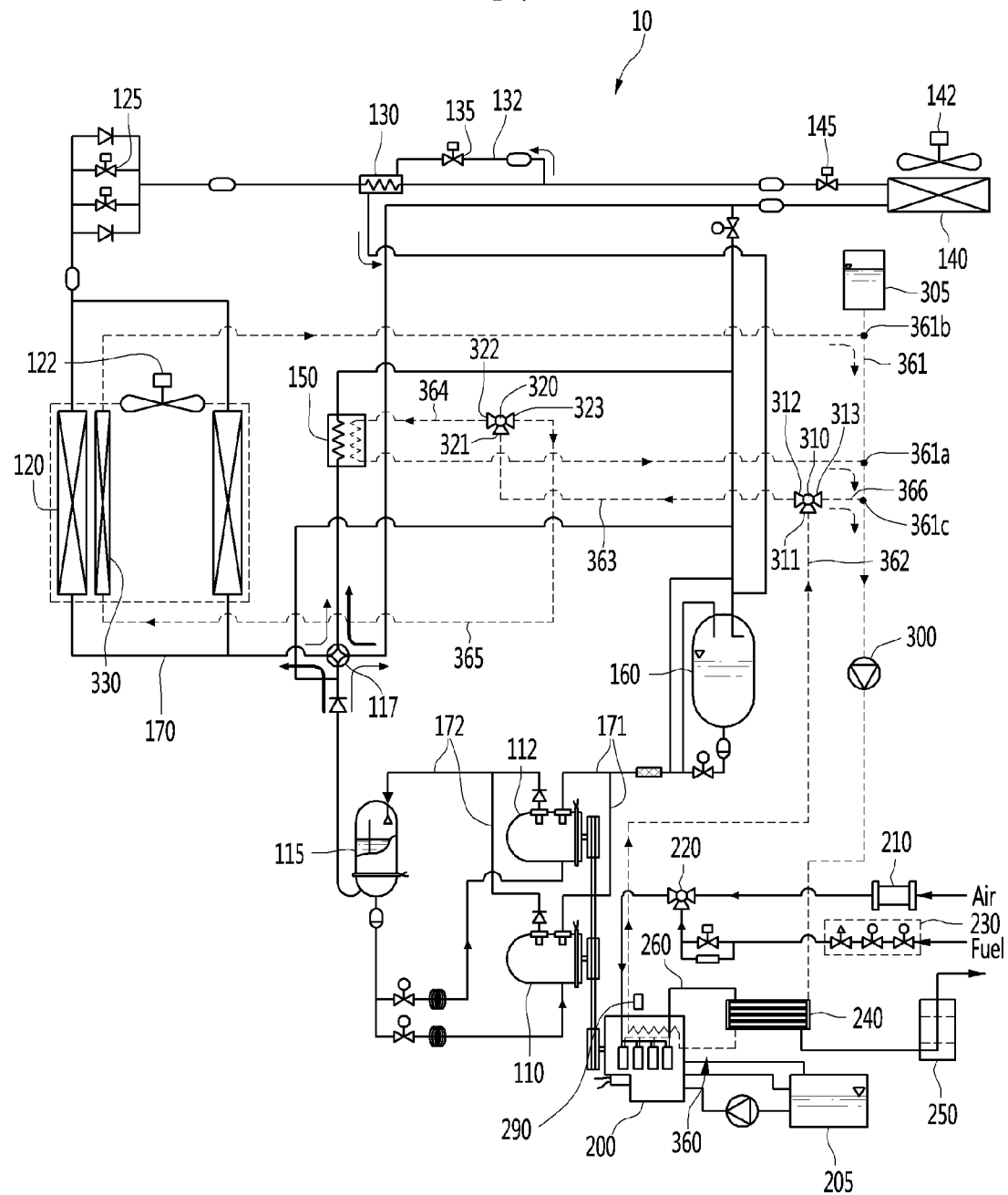
FIG. 1 is a system diagram illustrating a configuration of a gas heat pump and a flow of a refrigerant according to an embodiment.

Exemplary embodiments of the present disclosure will be described below in more detail with reference to the accompanying drawings. It is noted that the same or similar components in the drawings are designated by the same reference numerals as far as possible even if they are shown in different drawings. In the following description of the present disclosure, a detailed description of known functions and configurations incorporated herein will be omitted to avoid making the subject matter of the present disclosure unclear.

In the description of the elements of the present disclosure, the terms "first", "second", "A", "B", "(a)", and "(b)" may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

FIG. 1 is a system diagram illustrating a configuration of a gas heat pump and a flow of a refrigerant according to an embodiment.

Referring to FIG. 1, a gas heat pump system 10 according to an embodiment includes a plurality of components constituting a refrigerant cycle as an air conditioning system.

In detail, the refrigerant cycle includes first and second compressors 110 and 112 for compressing the refrigerant, an oil separator 115 for separating oil from the refrigerant compressed by the first and second compressors 110 and 112, and a four-way valve 117 for changing a direction of the refrigerant passing through the oil separator 115.

Cooling capacity, i.e., air-conditioning capacity of the gas heat pump system 10 may be determined based on compressibility of the compressors 110 and 112. The air-conditioning capability may include cooling capability and heating capability. The cooling capacity of the gas heat pump system 10 according to the present embodiment may be formed in the range of 71 kW to 85 kW.

The compressors 110 and 112 may include an inverter scroll compressor.

The gas heat pump system 10 further includes an outdoor heat exchanger 120 and an indoor heat exchanger 140. The outdoor heat exchanger 120 may be disposed inside the outdoor unit disposed at the outdoor side, and the indoor heat exchanger 140 may be disposed inside the indoor unit disposed at the indoor side. The refrigerant passing through the four-way valve 117 flows into the outdoor heat exchanger 120 or the indoor heat exchanger 140.

On the other hand, the configurations of the system shown in FIG. 1 may be disposed at the outdoor side, i.e., inside the outdoor unit, except for the indoor heat exchanger 140 and an indoor expansion device 145.

In detail, when the system 10 operates in a cooling operation mode, the refrigerant passing through the four-way valve 117 flows to the indoor heat exchanger 140 through the outdoor heat exchanger 120 (see a thick solid arrow).

On the other hand, when the system 10 operates in a heating operation mode, the refrigerant passing through the four-way valve 117 flows into the outdoor heat exchanger 120 through the indoor heat exchanger 140 (see a thin solid arrow).

The system 10 further includes a refrigerant pipe 170 (a solid-line passage) for connecting the compressors 110 and 112, the outdoor heat exchanger 120, the indoor heat exchanger 140, and the like to guide the flow of the refrigerant. In particular, the refrigerant pipe connected to the suction sides of the compressors 110 and 112 may be defined as a suction pipe 171, and the refrigerant pipe connected to the discharge sides of the compressors 110 and 112 may be defined as a discharge pipe 172.

The pipe diameter (outer diameter) of the refrigerant pipe 170 may be determined based on the air-conditioning capability of the gas heat pump system 10. For example, when the air-conditioning capability of the gas heat pump system 10 is increased, the pipe diameter of the refrigerant pipe 170 may be designed to be relatively large.

The structure of the system 10 will be described based on the cooling operation mode.

The refrigerant flowing into the outdoor heat exchanger 120 may be condensed by heat-exchange with external air. An outdoor fan 122 for blowing external air is included at one side of the outdoor heat exchanger 120.

A main expansion device 125 for decompressing the refrigerant is provided at the outlet side of the outdoor heat exchanger 120. For example, the main expansion device 125 includes an electronic expansion valve (EEV). During the cooling operation, the main expansion device 125 is fully opened and does not perform the operation of decompressing the refrigerant.

A supercooling heat exchanger 130 for further cooling the refrigerant is provided at the outlet side of the main expansion device 125. A supercooling passage 132 is connected to the supercooling heat exchanger 130. The supercooling passage 132 is branched from the refrigerant pipe 170 and connected to the supercooling heat exchanger 130.

A supercooling expansion device 135 is installed in the supercooling passage 132. The refrigerant flowing through the supercooling passage 132 may be decompressed while passing through the supercooling expansion device 135.

In the supercooling heat exchanger 130, heat exchange may be performed between the refrigerant of the refrigerant pipe 170 and the refrigerant of the supercooling passage 132. In the heat exchange process, the refrigerant of the refrigerant pipe 170 is supercooled, and the refrigerant of the supercooling passage 132 absorbs heat. The supercooled refrigerant and the refrigerant of the refrigerant pipe 170 are not mixed with each other to exchange heat with each other.

The supercooling passage 132 is connected to a gas/liquid separator 160. The refrigerant of the supercooling passage 132 heat-exchanged by the supercooling heat exchanger 130 may be introduced into the gas/liquid separator 160.

The refrigerant of the refrigerant pipe 170 passing through the supercooling heat exchanger 130 flows into the indoor unit side, is decompressed by the indoor expansion device 145, and is then evaporated by the indoor heat exchanger 140. The indoor expansion device 145 is installed inside the indoor unit and may be configured as an EEV.

The refrigerant evaporated by the indoor heat exchanger 140 flows into an auxiliary heat exchanger 150 via the four-way valve 117. The auxiliary heat exchanger 150 is a heat exchanger capable of heat exchange between the evaporated low-pressure refrigerant and the high-temperature coolant, and may include, for example, a plate heat exchanger.

The refrigerant evaporated by the indoor heat exchanger 140 absorbs heat from the coolant while passing through the auxiliary heat exchanger 150, thereby improving refrigerant evaporation efficiency. The outlet of the auxiliary heat exchanger 150 is connected to the gas/liquid separator 160.

The refrigerant passing through the auxiliary heat exchanger 150 may be separated into gas and liquid by the gas/liquid separator 160, and the separated gaseous refrigerant may be suctioned into the first and second compressors 110 and 112.

On the other hand, the gas heat pump system 10 further includes a coolant tank 305 and a coolant pipe 360 (dashed-line passage) which guides the flow of the coolant. In detail, the coolant supplied from the coolant tank absorbs waste heat generated by the engine 200 for driving the compressors 112 and 110 and cools the engine 200.

A coolant pump 300 for generating a flow force of the coolant, a plurality of flow converters 310 and 320 for converting the flow direction of the coolant, and a radiator 330 for cooling the coolant may be installed in the coolant pipe 360.

The plurality of flow converters 310 and 320 include a first flow converter 310 and a second flow converter 320. For example, the first flow converter 310 and the second flow converter 320 may include a three-way valve.

The radiator 330 may be installed at one side of the outdoor heat exchanger 120, and the coolant passing through the radiator 330 is heat-exchanged with external air by driving the outdoor fan 122. The coolant may be cooled in this process. That is, the coolant is cooled by releasing heat to external air while passing through the radiator 330.

Alternatively, when the outdoor heat exchanger 120 is driven as the evaporator in the heating operation mode, heat emitted from the radiator 330 may be transferred to the outdoor heat exchanger 120. Therefore, it is possible to prevent frost from being formed on the surface of the outdoor heat exchanger 120. As a result, there is an advantage in that a defrosting operation for eliminating frost is unnecessary.

When the coolant pump 300 is driven, the coolant stored in the coolant tank 305 absorbs heat while passing through the engine 200 and an exhaust gas heat exchanger 240, which will be described later, and heat is released by selectively flowing into the radiator 330 or the auxiliary heat exchanger 150 through the first flow converter 310 and the second flow converter 320.

On the other hand, the gas heat pump system 10 includes the engine 200 for generating power for driving the first and second compressors 110 and 120 and a mixer 220 disposed at the inlet side of the engine 200 to supply a mixed fuel.

The gas heat pump system 10 includes an air filter 210 for supplying purified air to the mixer 220 and a zero governor 230 for supplying fuel having a predetermined pressure or less. The zero governor may be understood as a device for constantly controlling an outlet pressure and supplying the fuel regardless of the magnitude of the inlet pressure of the fuel or the change in the flow rate.

The air passing through the air filter 210 and the fuel discharged from the zero governor 230 are mixed in the mixer 220 to produce a mixed fuel. The mixed fuel may be supplied to the engine 200.

The gas heat pump system 10 further includes an exhaust gas heat exchanger 240 which is provided at the outlet side of the engine 200 and into which exhaust gas generated after the mixed fuel is combusted is introduced, and a muffler 250 provided at the outlet side of the exhaust gas heat exchanger 240 to reduce noise of the exhaust gas. In the exhaust gas heat exchanger 240, heat exchange may be performed between the coolant and the exhaust gas.

An oil tank 205 for supplying oil to the engine 200 may be provided at one side of the engine 200.

The coolant pipe 360 includes a first pipe 361 extending from the coolant tank 305 toward the engine 200. In detail, the first pipe 361 includes a first pipe part extending from the coolant tank 305 to the exhaust gas heat exchanger 240, and a second pipe part extending from the exhaust gas heat exchanger 240 to the engine 200. Therefore, the coolant supplied from the coolant tank 305 is heat-exchanged with the exhaust gas while passing through the exhaust gas heat exchanger 240 and is introduced into the engine 200 to recover the waste heat of the engine 200. The coolant pump 300 for allowing the coolant to forcibly flow may be installed in the first pipe 361.

The coolant pipe 360 further includes a second pipe 362 configured to guide the coolant passing through the engine 200 to the first flow converter 310. The second pipe 362 is understood as a pipe extending from the outlet side of the engine 200 to a first port 311 of the first flow converter 310.

The coolant pipe 360 further includes a third pipe 363 configured to guide the coolant from the first flow converter 310 to the second flow converter 320. The third pipe 363 is understood as a pipe extending from a second port 312 of the first flow converter 310 to the first port 321 of the second flow converter 320.

The coolant pipe 360 further includes a fourth pipe 364 configured to guide the coolant from the second flow converter 320 to the auxiliary heat exchanger 150. The fourth pipe 364 extends from the second port 322 of the second flow converter 320 to the auxiliary heat exchanger 150, passes through the auxiliary heat exchanger 150, and then extends and connects to a first point 361a of the first pipe 361.

The coolant pipe 360 further includes a fifth pipe 365 configured to guide the coolant from the second flow converter 320 to the radiator 150. The fifth pipe 365 extends from a third port 323 of the second flow converter 320 to the radiator 150, passes through the radiator 150, and then extends and connects to a second point 361b of the first pipe 361.

The coolant pipe 360 further includes a sixth pipe 366 configured to guide the coolant from the first flow converter 310 to the first pipe 361. The sixth pipe 366 may be understood as a pipe extending from the third port 313 of the first flow converter 310 and connecting to a third point 361c of the first pipe 361.

For example, the temperature of the coolant passing through the engine 200 is less than a set temperature, and the amount of waste heat absorbed from the engine 200 is not large. In this case, the coolant flowing into the first port 311 of the first flow switching unit 310 may be bypassed to the first pipe 361 through the sixth pipe 366, without flowing into the auxiliary heat exchanger 150 or the radiator 330 to heat exchange. The sixth pipe 366 may be referred to as a "bypass pipe."

The gas heat pump system 10 further includes a coolant temperature sensor 290 installed at the outlet side of the engine 200 to detect the temperature of the coolant passing through the engine 200. When the temperature of the coolant detected by the coolant temperature sensor 290 is higher than or equal to a set temperature, the gas heat pump system 10 operates in a first mode in which the coolant flows from the first flow converter 310 toward the auxiliary heat exchanger 9150 or the radiator 330. When the temperature of the coolant detected by the coolant temperature sensor 290 is lower than the set temperature, the gas heat pump system 10 operates in a second mode in which the coolant is bypassed toward the coolant pump 300 through the sixth pipe 366 in the first flow converter 310 as described above.

Hereinafter, the operation of the refrigerant, the coolant, and the mixed fuel according to the operation mode of the gas heat pump system 10, according to the embodiment of the present disclosure, will be described.

[Heating Operation]

First, when the gas heat pump system 10 performs a heating operation, the refrigerant passes through the first and second compressors 110 and 112, the oil separator 115, the four-way valve 117, the indoor heat exchanger 140, and the supercooling heat exchanger 130, is decompressed by the main expansion device 125, is heat-exchanged by the outdoor heat exchanger 120, and flows back to the four-way valve 117. The indoor heat exchanger 140 may function as a "condenser," and the outdoor heat exchanger 120 may function as an "evaporator."

The refrigerant passing through the four-way valve 117 may be introduced into the auxiliary heat exchanger 150 and heat-exchanged with the coolant flowing through the fourth pipe 364. The refrigerant introduced into the auxiliary heat exchanger 150 forms a low temperature and a low pressure as an evaporation refrigerant, and the coolant supplied to the auxiliary heat exchanger 150 forms a high temperature by the heat of the engine 200. Therefore, the refrigerant of the auxiliary heat exchanger 150 may absorb heat from the coolant to improve evaporation performance.

The refrigerant heat-exchanged by the auxiliary heat exchanger 150 may be introduced into the gas/liquid separator 160, phase-separated, and then suctioned into the first and second compressors 110 and 112. The refrigerant may be flowed by repeating the above cycle.

On the other hand, when the coolant pump 300 is driven, the coolant discharged from the coolant pump 300 flows into the exhaust gas heat exchanger 240 along the first pipe 361 to exchange heat with the exhaust gas. The coolant discharged from the exhaust gas heat exchanger 240 flows into the engine 200 to cool the engine 200, passes through the second pipe 362, and flows into the first port 311 of the first flow converter 310.

Due to the control of the first flow converter 310, the coolant passing through the first flow converter 310 is directed toward the second flow converter 320 along the third pipe 363. The coolant passing through the second flow converter 320 may flow into the auxiliary heat exchanger 150 via the fourth pipe 364 to exchange heat with the refrigerant. The coolant passing through the auxiliary heat exchanger 150 flows into the coolant pump 300. The coolant may be flowed by repeating the above cycle.

On the other hand, the flow of the coolant to the radiator 330 during the heating operation may be limited. In general, since the heating operation is performed when the temperature of the external air is low, the coolant is highly likely to be cooled in the process of flowing through the coolant pipe 360 even though the coolant is not cooled in the radiator 330. Therefore, the first and second flow converters 310 and 320 may be controlled such that the coolant does not pass through the radiator 330 during the heating operation.

However, when the heat exchange in the auxiliary heat exchanger 150 is not necessary, or in order to prevent a phenomenon that frost occurs on the surface of the outdoor heat exchanger 120, the coolant may flow into the radiator 330 from the second flow converter 320 via the fifth pipe 365.

The driving of the engine 200 will be described.

The air filtered by the air filter 210 and the fuel pressure-controlled through the zero governor 230 are mixed in the mixer 220. The mixed fuel mixed in the mixer 220 is supplied to the engine 200 to drive the engine 200. The exhaust gas discharged from the engine 200 flows into the exhaust gas heat exchanger 240 to exchange heat with the coolant, and is discharged to the outside through the muffler 250.

[Cooling Operation]

On the other hand, when the gas heat pump system 10 performs a cooling operation, the refrigerant passes through the first and second compressors 110 and 112, the oil separator 115, the four-way valve 117, the outdoor heat exchanger 120, and the supercooling heat exchanger 130, is decompressed by the indoor expansion device 145, is heat-exchanged by the indoor heat exchanger 140, and flows back to the four-way valve 117. The outdoor heat exchanger 120 may function as a "condenser," and the indoor heat exchanger 140 may function as an "evaporator."

The refrigerant passing through the four-way valve 117 may be introduced into the auxiliary heat exchanger 150 and heat-exchanged with the coolant flowing through the coolant pipe 360. The refrigerant heat-exchanged by the auxiliary heat exchanger 150 may be introduced into the gas/liquid separator 160, phase-separated, and then suctioned into the first and second compressors 110 and 112. The refrigerant may be flowed by repeating the above cycle.

On the other hand, when the coolant pump 300 is driven, the coolant discharged from the coolant pump 300 is introduced into the exhaust gas heat exchanger 240 and heat-exchanged with the exhaust gas. The coolant discharged from the exhaust gas heat exchanger 240 flows into the engine 200 to cool the engine 200, and flows into the first flow converter 310. The flow of the coolant flow until flowing into the first flow converter 310 is the same as the flow of the coolant during the heating operation.

The coolant passing through the first flow converter 310 flows into the second flow converter 320, and flows into the radiator 330 under the control of the second flow converter 320 to exchange heat with the external air. The coolant cooled by the radiator 330 flows into the coolant pump 300. The coolant may be flowed by repeating the above cycle.

On the other hand, the flow of the coolant to the auxiliary heat exchanger 150 during the cooling operation may be limited. In general, since the cooling operation is performed when the temperature of the external air is high, the heat absorption of the evaporation refrigerant for securing the evaporation performance may not be required. Therefore, the first and second flow converters 310 and 320 may be controlled such that the coolant does not pass through the auxiliary heat exchanger 150 during the cooling operation.

However, when the heat exchange in the auxiliary heat exchanger 150 is required, the coolant may flow into the auxiliary heat exchanger 150 via the second flow converter 320.

Since the driving of the engine 200 is the same as the operation during the heating operation, a redundant description thereof will be omitted.

[Refrigerant]

The refrigerant may circulate through the outdoor unit and the indoor unit to perform the cooling or heating operation of the gas heat pump system 10. For example, the refrigerant may include R21 or R134a as a single refrigerant.

The R32 is a methane-based halogenated carbon compound and expressed by Formula $CH_2F_2$. The R32 is an eco-friendly refrigerant having ozone depletion potential (ODP) less than that of the R22 (Chemical Formula: $CHCLF_2$) according to the related art, and thus, a discharge pressure of the compressor is high.

The R134a is an ethane-based halogenated carbon compound and expressed by Formula $CF_3CH_2F$. The R134a may be used for the air conditioner including the gas heat pump system as a refrigerant replacing the R12 (Chemical Formula: $CCl_2F_2$) according to the related art.

For another example, the refrigerant may include R410a as a non-azeotropic mixed refrigerant.

The R410a is a material in which the R32 and R125 (Chemical Formula $CHF_2CF_3$) are mixed at a weight ratio of 50:50. When the refrigerant is evaporated (saturated liquid=>saturated gas) in the evaporator, a temperature increases, and when the refrigerant is condensed (saturated gas=>saturated liquid) in the condenser, the temperature decreases. As a result, heat exchange efficiency may be improved.

For another example, the refrigerant may include R407c as a non-azeotropic mixed refrigerant. The R407c is a material in which the R32, the R125, and the R134a are mixed at a weight ratio of 23:25:52. Since the R407c has ozone destruction coefficient less than that of the R22 according to the related art and a vapor pressure similar to that of the R22, the replacement of the equipment constituting the existing refrigeration cycle may be minimized to reduce the cost.

In this embodiment, the R410a is used as the refrigerant circulating through the gas heat pump system 10.

[Refrigerant Circulation Amount]

The refrigerant may be filled into the gas heat pump system 10 according to an embodiment. A filling amount of refrigerant may be determined based on a length of the refrigerant pipe 170 constituting the gas heat pump system 10. For example, in the case of the gas heat pump system 10 having an air-conditioning capability of 71 kW, 10.5 kg of the refrigerant may be filled.

[Oil]

Oil for lubricating or cooling the compressor 100 is contained in the gas heat pump system 10 according to an embodiment. The oil may include a PAG-based refrigerating machine oil, a PVE-based refrigerating machine oil, or a POE-based refrigerating machine oil.

The PAG-based refrigerating machine oil is a synthetic oil made of propylene oxide as a raw material and has a relatively high viscosity and thus has excellent viscosity characteristics depending on a temperature. Thus, when the PAG-based refrigerating machine oil is used, the compressor may be reduced in load.

The PVE-based refrigerating machine oil is a synthetic oil made of ether as a raw material and has good compatibility with the refrigerant, high volume resistivity, and excellent electrical stability. For example, the PVE-based refrigerating machine oil may be used for the compressor using the refrigerant such as the R32, the R124a, or the R410a.

The POE-based refrigerating machine oil is a synthetic oil obtained by dehydrating condensation of polyhydric alcohol and carboxylic acid and has good compatibility with the refrigerant and also has excellent oxidation stability and thermal stability in air. For example, the POE-based refrigerating machine oil may be used for the compressor using the refrigerant such as the R32 or the R410a.

In this embodiment, the PVE-based refrigerating machine oil, e.g., FVC68D may be used as the refrigerating machine oil.

[New Material Pipe]: Ductile Stainless Steel Pipe

The refrigerant pipe 170 may include a new material pipe that is strong and having excellent workability. In detail, the new material pipe may be made of a stainless steel material and a material having at least copper (Cu)-containing impurities. The new material pipe has strength greater than that of a copper (Cu) pipe and workability superior to that of the stainless steel pipe. For example, the new material pipe may be called a "ductile stainless steel pipe". The ductile stainless steel pipe refers to a pipe made of ductile stainless steel.

When the refrigerant pipe 170 is provided as the copper pipe, a kind of refrigerant circulating through the copper pipe may be limited. The refrigerant may be different in operation pressure range according to the kind of refrigerant. If the high-pressure refrigerant having a high operation pressure range, that is, a high pressure that is capable of increasing is used for the copper pipe, the copper pipe may be broken, and thus the leakage of the refrigerant may occur.

However, when the ductile stainless steel pipe is used as the new material pipe like this embodiment, the above-described limitation may be prevented from occurring.

[Property of Ductile Stainless Steel]

The ductile stainless steel has strength and hardness less than those of the stainless steel according to the related art, but has a good bending property. The ductile stainless steel pipe according to an embodiment has strength and hardness less than those of the stainless steel according to the related art, but remains to at least the strength and hardness of the copper pipe. In addition, since the ductile stainless steel pipe has a bending property similar to that of the copper pipe, bending workability may be very good. Here, the bending property and the bendability may be used in the same sense.

As a result, since the ductile stainless steel pipe has strength greater than that of the copper pipe, the possibility of the damage of the pipe may be reduced. Thus, there is an effect that the number of types of refrigerant capable of being selected in the gas heat pump system 10 increases.

[Suction Pipe of Compressor]

The refrigerant pipe 170 includes a suction pipe 171 guiding suction of the refrigerant into the compressors 110 and 112. The suction pipe 171 may be understood as a pipe extending from gas/liquid separator 610 to the compressors 110 and 112.

[Discharge Pipe of Compressor]

The refrigerant pipe 170 further includes a discharge pipe 172 through which the refrigerant compressed in the compressors 110 and 112 is discharged. The discharge pipe 172 may be understood as a pipe extending from a discharge portion of the compressors 110 and 112 to the oil separator 115.

Since the high-pressure gas refrigerant flows through the discharge pipe 172, and thus the discharge pipe 172 largely moves by vibration occurring in the compressors 110 and 112, it is necessary to maintain the strength of the discharge pipe 172 to preset strength or more. When the discharge pipe 172 is provided as the new material pipe, the discharge pipe 172 may be maintained at high strength to prevent the refrigerant from leaking by the damage of the discharge pipe 172.

A relatively low-pressure refrigerant flows through the suction pipe 171, but the pipe is disposed adjacent to the compressors 110 and 112, the movement due to the vibration of the compressors 110 and 112 may be largely large. Thus, since the strength of the suction pipe 171 is required to be maintained to the preset strength or more, the suction pipe 171 may be provided as the new material pipe.

Hereinafter, constituents defining the characteristics of the ductile stainless steel according to an embodiment will be described. It is noted that the constitutional ratios of the constituents described below are weight percent (wt. %).

1. Composition of Stainless Steel (1) Carbon (C): 0.03% or less

The stainless steel according to an embodiment includes carbon (C) and chromium (Cr). Carbon and chromium react with each other to precipitate into chromium carbide. Here, the chromium is depleted around a grain boundary or the chromium carbide to cause corrosion. Thus, the carbon may be maintained at a small content.

Carbon is an element that is bonded to other elements to act to increase creep strength. Thus, if the content of carbon exceeds 0.03%, the ductility may be deteriorated. Thus, the content of the carbon is set to 0.03% or less.

(2) Silicon (Si): more than 0% and less than 1.7%

An austenite structure has yield strength less that that of a ferrite structure or martensite structure. Thus, a matrix structure of the stainless steel may be made of austenite so that the ductile stainless steel according to an embodiment has a bending property (degree of freedom of bending) equal or similar to that of the copper.

However, silicon is an element forming ferrite, the more a content of silicon increases, the more a ratio of the ferrite in the matrix structure increases to improve stability of the ferrite. It is preferable that the silicon is maintained to be the content of silicon as low as possible, but it is impossible to completely block introduction of silicon into impurities during the manufacturing process.

When a content of silicon exceeds 1.7%, the stainless steel has hardly ductility at a level of the copper material, and also, it is difficult to secure sufficient workability. Thus, a content of silicon contained in the stainless steel according to an embodiment is set to 1.7% or less.

(3) Manganese: 1.5% to 3.5%

Manganese acts to suppress phase transformation of the matrix structure of the stainless steel into a martensite type material and expand and stabilize an austenite region. If a content of manganese is less than 1.5%, the phase transformation suppressing effect by manganese does not sufficiently occur. Thus, to sufficiently obtain the phase transformation suppressing effect by manganese, a lower limit of a content of manganese is set to 1.5% or less.

However, as the content of manganese increases, the yield strength of the stainless steel increases to deteriorate the ductility of the stainless steel. Thus, an upper limit of the content of manganese is set to 3.5%.

(4) Chromium (Cr): 15% to 18%

Chromium is an element that improves corrosion initiation resistance of the stainless steel. The corrosion initiation refers to first occurrence of the corrosion in a state in which the corrosion does not exist in a base material, and the corrosion initiation resistance refers to a property of suppressing the first occurrence of the corrosion in the base material. This may be interpreted to have the same means as corrosion resistance.

Since the stainless steel does not have the corrosion initiation resistance (corrosion resistance) when a content of chromium is less than 15.0%, a lower limit of the content of chromium is set to 15.0%.

On the other hand, if the content of chromium is too large, the ferrite structure is formed at room temperature to reduce the ductility. Particularly, the stability of the austenite is lost at a high temperature to reduce the strength. Thus, an upper limit of the content of the chromium is set to 18.0% or less.

(5) Nickel (Ni): 7.0% to 9.0%

Nickel has a property of improving corrosion growth resistance of the stainless steel and stabilizing the austenite structure.

Corrosion growth refers to growth of corrosion that already occurs in the base material while spreading over a wide range, and the corrosion growth resistance refers to a property of suppressing the growth of the corrosion.

Since the stainless steel does not have the corrosion growth resistance when a content of nickel is less than 7.0%, a lower limit of the content of nickel is set to 7.0%.

Also, when the content of nickel is excessive, the stainless steel increases in strength and hardness, and thus it is difficult to secure sufficient workability of the stainless steel. In addition, the cost increase, and thus it is not desirable economically. Thus, an upper limit of the content of the nickel is set to 9.0% or less.

(6) Copper (Cu): 1.0% to 4.0%

Copper acts to inhibit phase transformation of the matrix structure of the stainless steel into a martensite structure and improve the ductility of the stainless steel. If a content of copper is less than 1.0%, the phase transformation suppressing effect by copper does not sufficiently occur. Thus, to sufficiently obtain the phase transformation suppressing effect by copper, a lower limit of a content of copper is set to 1.0% or less.

Particularly, the content of copper has to set to 1.0% or more so that the stainless steel has a bending property equal or similar to that of the copper.

Although the more the content of copper increases, the more the phase transformation suppressing effect of the matrix structure increases, the increase gradually decreases. Also, if the content of copper is excessive to exceed 4% to 4.5%, since the effect is saturated, and the occurrence of martensite is promoted, it is not preferable. Also, since copper is an expensive element, it affects economical efficiency. Thus, an upper limit of the content of copper is set to 4.0% so that the effect of suppressing the phase transformation of copper is maintained to the saturation level, and the economical efficiency is secured.

(7) Molybdenum (Mo): 0.03% or less (8) Phosphorus (P): 0.04% or less (9) Sulfur (S): 0.04% or less

(10) Nitrogen (N): 0.03% or less

Since molybdenum, phosphorus, sulfur, and nitrogen are elements originally contained in the steel-finished product and cure the stainless steel, it is desirable to maintain the contents as low as possible.

2. Matrix Structure of Stainless Steel

When the stainless steel is classified in view of a metal structure (or matrix structure), the stainless steel is classified into austenite type stainless steel containing chromium (18%) and nickel (8%) as main components and ferrite type stainless steel containing chromium (18%) as a main component, and martensite type stainless steel containing chromium (8%) as a main component.

Also, since the austenite type stainless steel is excellent in corrosion resistance against salt and acid and has high ductility, the ductile stainless steel according to an embodiment is preferably the austenite type stainless steel.

Also, the austenite structure has yield strength and hardness less that those of the ferrite structure or the martensite structure. Furthermore, when a crystal size is grown under the same condition, an average grain size of the austenite is the largest and thus is advantageous for improving the ductility.

To improve the ductility of the stainless steel, the matrix structure of the stainless steel may be formed as only the austenite structure. However, since it is very difficult to control the matrix structure of the stainless steel with only the austenite, it is inevitable to include other structure.

In detail, the other matrix structure that affects the ductility of the austenite type stainless steels is delta ferrite (δ-ferrite) which occurs during the heat treatment process. That is, the more a content of the delta ferrite, the more the hardness of the stainless steel increases, but the ductility of the stainless steel decreases.

The stainless steel may have an austenite matrix structure of 90% or more, preferably 99% or more and a delta ferrite matrix structure of 1% or more on the base of a grain area. Thus, one of methods for improving the ductility of the stainless steels is to reduce an amount of delta ferrite contained in the austenite type stainless steel.

Even when the ductile stainless steel according to an embodiment has a delta ferrite matrix structure of 1% or less, the fact that the delta ferrite is locally distributed in a specific crystal grain rather than being uniformly distributed throughout the crystal grain is advantageous in improvement of the ductility.

[Microstructure of Ductile Stainless Steel]

Figure 2:
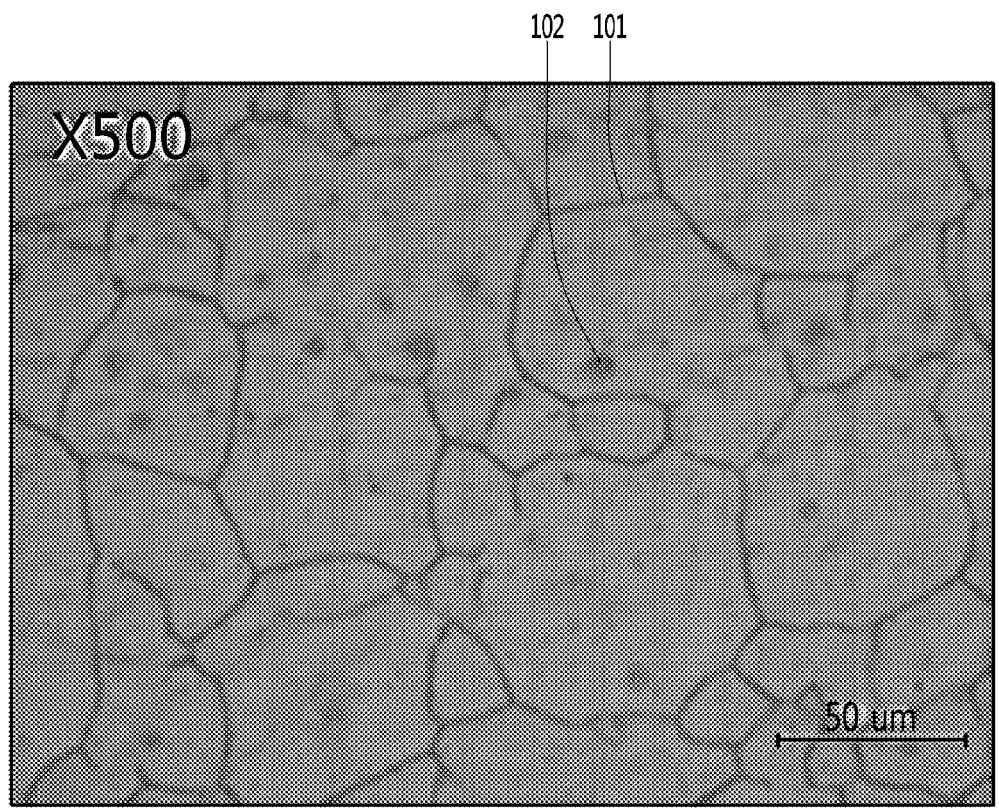
FIG. 2 is a microstructure photograph of a stainless steel having an austenite matrix structure of 99% and a delta ferrite structure of 1% or less.
Figure 3:
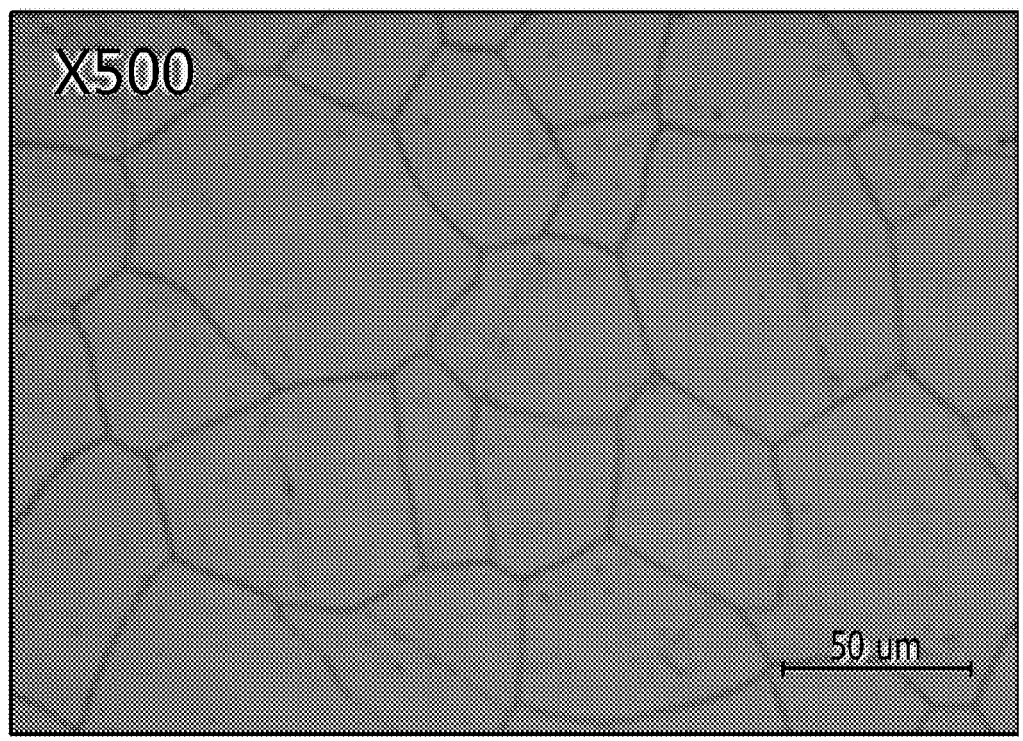
FIG. 3 is a microstructure photograph of a stainless steel having only the austenite matrix structure.

FIG. 2 is a microstructure photograph of a stainless steel having an austenite matrix structure of 99% and a delta ferrite structure of 1% or less, and FIG. 3 is a microstructure photograph of a stainless steel having only the austenite matrix structure. The stainless steel having the structure of FIG. 2 is a microstructure of the ductile stainless steel according to an embodiment.

The stainless steel of FIG. 2 and the stainless steel of FIG. 3 have average grain sizes corresponding to grain size Nos. 5.0 to 7.0. The average gain size will be descried below.

Table 1 below is a graph of results obtained by comparing mechanical properties of the stainless steel (a material 1) of FIG. 2 and the stainless steel (a material 2) of FIG. 2.

TABLE 1

| | | Mechanical Property | | | |
|---|---|---|---|---|---|
| | Kind | Yield Strength [MPa] | Tensile Strength [MPa] | Hardness [Hv] | Elongation [%] |
| Material 1 | Stainless Steel (Austenite + Delta Ferrite) | 180 | 500 | 120 | 52 |
| Material 2 | Stainless Steel (Austenite) | 160 | 480 | 110 | 60 |

Referring to Table 1, it is seen that the material 2 has a physical property less than that of the material 1 in strength and hardness. Also, it is seen that the material 2 has an elongation greater than that of the material 1. Therefore, to lower the strength and the hardness of the stainless steel, it is ideal that the stainless steel has only the austenite matrix structure. However, since it is difficult to completely remove the delta ferrite matrix structure, it is desirable to minimize a ratio of the delta ferrite matrix structure.

Also, as described above, when the delta ferrite structures are densely distributed in a specific grain rather than uniformly distributed, the effect is more effective for the ductility the stainless steel.

In FIG. 2, a large grain 101 represents an austenite matrix structure, and a small grain 102 in the form of a black spot represents a delta ferrite matrix structure.

3. Average Grain Diameter of Stainless Steel

An average grain diameter of the stainless steel may be determined according to composition and/or heat treatment conditions. The average grain diameter of the stainless steel affects the strength and the hardness of the stainless steel. For example, the more the average grain diameter decreases, the more the stainless steel increase in strength and hardness, and the more the average grain diameter increases, the more the stainless steel decrease in strength and hardness.

The ductile stainless steel according to an embodiment has properties of low strength and hardness when compared to the stainless steel according to the related art in addition to good bending property by controlling the content of copper and the grain area of delta ferrite, and also, the ductile stainless steel has strength and hardness greater than those of copper.

For this, the average grain diameter of the stainless steel is limited to 30 μm to 60 μm. An average grain diameter of a general austenite structure is less than 30 μm. Thus, the average grain diameter has to increase to 30 μm through the manufacturing process and the heat treatment.

According to the criteria of American Society for Testing and Materials (ASTM), the average grain diameter of 30 μm to 60 μm corresponds to grain size Nos. 5.0 to 7.0. On the other hand, an average grain diameter less than 30 μm corresponds to ASTM grain size No. 7.5 or more.

If the average grain diameter of the stainless steel is less than 30 μm, or the grain size number is greater than 7.0, it does not have the properties of low strength and low hardness required in this embodiment. Particularly, the average grain diameter (or the grain size number) of the stainless steel is a key factor in determining the properties of the low strength and the low hardness of the stainless steel.

Referring to Table 2 below, since the copper pipe according to the related art has physical properties of the low strength and the low hardness, the copper pipe is commercialized as the refrigerant pipe constituting the refrigerant circulation cycle, but there is a limitation of reliability due to the corrosion and pressure resistance against a new refrigerant.

Also, since the stainless steels of Comparative Examples 2 to 5 have excessively large strength and hardness in comparison to the copper pipes, there is a limitation that the workability is poor even if the limitation of the corrosion and the pressure resistance of copper are solved.

On the other hand, the stainless steel according to an embodiment has strength and hardness greater than those the copper pipes according to the related art and has strength and hardness less than those of the stainless steels of Comparative Examples 2 to 5. Therefore, since the corrosion resistance and the pressure resistance of the copper pipe are solved, it is suitable to be used as a high-pressure new refrigerant pipe such as R32.

In addition, since it has an elongation greater than that of the copper pipe, the limitation of workability of the stainless steel according to the related art may also be solved.

TABLE 2

| Kind | | Mechanical Property | | | |
|---|---|---|---|---|---|
| | | Yield Strength [MPa] | Tensile Strength [MPa] | Hardness [Hv] | Elongation [%] |
| Comparative Example 1 | Copper Pipe (C1220T) | 100 | 270 | 100 | 45 or more |
| Comparative Examples 2-5 | Stainless Steel (Grain Size No. 7.5 or more) | about 200 | about 500 | about 130 | 50 or more |
| Embodiment | Stainless Steel (Grain Size No. 5.0~7.0) | about 160 | about 480 | about 120 | 60 or more |

In summary, the ductile stainless steel defined in an embodiment may represent stainless steel which has 99% of austenite and 1% or less of delta ferrite and in which the above-described components are contained at a preset ratio.

Figure 4:
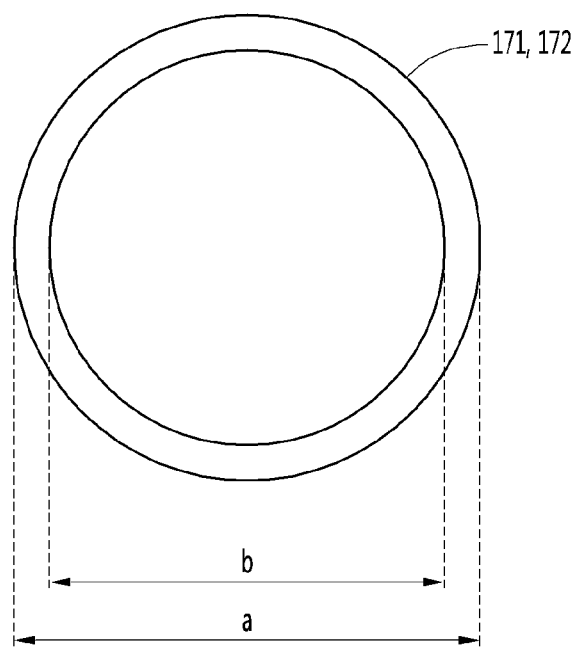
FIG. 4 is a view illustrating an outer diameter and an inner diameter of a refrigerant pipe according to an embodiment.

FIG. 4 is a view illustrating an outer diameter and an inner diameter of the refrigerant pipe according to an embodiment.

Referring to FIGS. 1 and 4, when the compressors 110 and 112 according to an embodiment are driven, the refrigerant suctioned into the compressors 110 and 112 involves a temperature change after the compression. Due to the change in temperature, a change in stress at the suction pipe 171 and the discharge pipe 172 may be more severe than other pipes.

As illustrated in FIG. 3, this embodiment is characterized in that the suction pipe 171 and the discharge pipe 172, which exhibit the most severe pressure and vibration when the refrigerant changes in phase, are formed as the ductile stainless steel pipe subjected to a ductileness process to increase allowable stress. However, the present disclosure is not limited to only the suction pipe and the discharge pipe, and any one or more pipes connecting the outdoor unit to the indoor unit may be provided as the ductile stainless steel pipe according to the variation of the stress.

The air-conditioning capacity of the gas heat pump system 10 according to an embodiment may be selected in the range of 71 kW to 85 kW. An outer diameter of the ductile stainless steel pipe may be determined based on the selected air-conditioning capacity of the gas heat pump system 10.

Also, the refrigerant used in the gas heat pump system 10 according to an embodiment may include the R32, the R134a, the R401a, or R407c as described above. Particularly, a thickness of the ductile stainless steel pipe may be differently determined according to kinds of refrigerants.

[Method for Setting Thickness of Ductile Stainless Steel Pipe]

A thickness of the ductile stainless steel pipe may be determined according to the following Mathematical Equation. The Mathematical Equation below is calculated based on ASME B31.1, which provides codes for standards and guidelines for a pipe, and KGS Code, which categorizes technical items such as facilities, technologies, and inspections specified by gas related laws and regulations.

$$t_m = \frac{P \times D_0}{2S + 0.8P} + T_{extra} \qquad \text{[Mathematical Equation 1]}$$

Here, tm represents a minimum thickness of the stainless steel pipe, P represents a design pressure (Mpa), D0 represents an outer diameter (mm) of the stainless steel pipe, S represents allowable stress (M/mm²), and $T_{extra}$ represents a clearance thickness according to corrosion, thread working, and the like. The $T_{extra}$ is determined to be 0.2 when a material of the pipe is made of copper, aluminum, or stainless steel.

[Definition of Pipe Diameter]

As illustrated in FIG. 4, an outer diameter of the ductile stainless steel pipe used for the suction pipe 171 or the discharge pipe 172 may be defined as a, and an inner diameter may be defined as b. Referring to Mathematical Equation 1, it is seen that the minimum thickness of the pipe is proportional to the outer diameter of the pipe and inversely proportional to the allowable stress.

[Allowable Stress S]

The allowable stress represents a value obtained by dividing reference strength by a safety factor, i.e., a maximum value of stress (deformation force) that is allowed to exert weight, which is considered to be tolerable without deformation or breakage of the pipe when external force is applied to the pipe.

In this embodiment, the allowable stress standard of the ductile stainless steel pipe is derived to satisfy the code written in ASME SEC. VIII Div. 1, and the allowable stress S may be set to a relatively small value of a value obtained by dividing the tensile strength of the pipe by 3.5 or a value obtained by dividing the yield strength of the pipe by 1.5. The allowable stress may be a value that varies depending on the material of the pipe and be determined to 93.3 Mpa on the basis of the SME SEC. VIII Div. 1.

When the same stress is applied to the pipe, the stainless steel may have a stress margin greater than that of copper, and thus a degree of design freedom of the pipe may increase. As a result, to reduce the stress transmitted to the pipe, it is possible to escape the restriction that the pipe has to have a long length. For example, to reduce vibration transmitted from the compressors 110 and 112, it is unnecessary to bend the pipe several times in the form of a loop within a limited installation space.

[Outer Diameter of Ductile Stainless Steel Pipe]

Air-conditioning capacity of the gas heat pump system 10, i.e., cooling capacity or heating capacity may be determined based on compressibility of the compressors 110 and 112. Also, an outer diameter of the ductile stainless steel pipe may be determined according to the cooling capacity of the compressor. That is, the capacity of the compressor may be a criterion for determining the outer diameter of the ductile stainless steel pipe.

For example, in the gas heat pump system 10 having air-conditioning capacity between 71 kW to 85 kW, when the suction pipe 171 and the discharge pipe 172 are provided as the ductile stainless steel pipes, the suction pipe 171 may have an outer diameter of 31.80 mm and the discharge pipe 172 may have an outer diameter of 19.05 mm.

[Design Pressure P According to Kind of Refrigerant]

A design pressure may be a pressure of the refrigerant and correspond to a condensation pressure of the refrigerant cycle. For example, the condensation pressure may be determined based on a temperature value (hereinafter, referred to as a condensation temperature) of the refrigerant condensed in the outdoor heat exchanger 120 or the indoor heat exchanger. Also, the design pressure may represent a saturated vapor pressure of the refrigerant at the condensation temperature. In general, the air conditioner may have a condensation temperature of about 65° C.

The saturated vapor pressure according to kinds of refrigerants is shown in Table 3.

TABLE 3

| Refrigerant Temperature (° C.) | R134a (Mpa) | R410a (Mpa) | R32 (Mpa) |
|---|---|---|---|
| −20 | 0.03 | 0.30 | 0.30 |
| 0 | 0.19 | 0.70 | 0.71 |
| 20 | 1.47 | 1.35 | 1.37 |
| 40 | 0.91 | 2.32 | 1.47 |
| 60 | 1.58 | 3.73 | 3.85 |
| 65 | 1.79 | 4.15 | 4.30 |

Referring to Table 3, when the R410A is used as the refrigerant, a saturated vapor pressure at 65° C. is 4.15, and thus the design pressure P may be determined to 4.15 (MPa).

[Calculation of Minimum Thickness of Ductile Stainless Steel Pipe]

As described above, the allowable stress S is given by ASME SEC. VIII Div. 1, and the design pressure P is determined to 4.15 MPa when the refrigerant is R410a, and the refrigerant temperature is 65° C. A minimum thickness of the pipe, which is calculated according to the outer diameter of the pipe by applying the determined allowable stress S and the design pressure P to Mathematical Equation 1 may be confirmed by the following Table 4.

TABLE 4

| Outer Diameter of Standard Pipe | Embodiment to which margin is applied (ductile stainless steel pipe) R410a | Comparative Example (copper pipe) | Calculated Minimum Thickness (R410a) ASME B31.1 ($t_m$) | Calculated Minimum Thickness (R410a) JIS B 8607 ($t_m - t_{exrta}$) |
|---|---|---|---|---|
| φ4.00 | 0.40 | | 0.30 | 0.10 |
| φ4.76 | 0.40 | | 0.32 | 0.12 |
| φ5.00 | 0.40 | | 0.33 | 0.13 |
| φ6.35 | 0.40 | 0.622 | 0.36 | 0.16 |
| φ7.00 | 0.40 | | 0.38 | 0.18 |
| φ7.94 | 0.50 | 0.622 | 0.40 | 0.20 |
| φ9.52 | 0.50 | 0.622 | 0.44 | 0.24 |
| φ12.70 | 0.60 | 0.622 | 0.53 | 0.33 |
| φ15.88 | 0.70 | 0.800 | 0.61 | 0.41 |
| φ19.05 | 0.80 | 0.800 | 0.69 | 0.49 |
| φ22.20 | 1.00 | 1.041 | 0.77 | 0.57 |
| φ25.40 | 1.00 | 1.168 | 0.85 | 0.65 |
| φ28.00 | 1.00 | 1.168 | 0.92 | 0.72 |
| φ31.80 | 1.20 | 1.283 | 1.01 | 0.81 |
| φ34.90 | 1.20 | 1.283 | 1.09 | 0.89 |
| φ38.10 | 1.20 | 1.410 | 1.18 | 0.98 |
| φ41.28 | 1.20 | 1.410 | 1.26 | 1.06 |
| φ50.80 | 1.50 | | 1.50 | 1.30 |
| φ54.00 | 1.50 | 1.623 | 1.58 | 1.38 |

Referring to Table 4, a minimum thickness of the ductile stainless steel pipe derived based on ASME B31.1 and a minimum thickness of the ductile stainless steel pipe derived based on JIS B 8607 may be confirmed. Here, in an embodiment, the ductile stainless steel pipe was used, and in Comparative example, the existing copper pipe was used.

JIS B 8607 is a reference code for a pipe used in Japan. In case of JIS B 8607, a minimum thickness is derived to be less than that in case of ASME B31.1 because the $t_{extra}$ value that is the clearance thickness due to corrosion and the thread working is not considered, unlike ASME B31.1. The $t_{extra}$ value may be set to 0.2 mm in case of copper, a copper alloy, aluminum, an aluminum alloy, and stainless steel.

Although the minimum thickness of the ductile stainless steel pipe according to an embodiment is derived based on ASME B31.1, the minimum thickness may be applicable with a predetermined margin determined between about 0.1 mm to about 0.2 mm in consideration of the pressure when the R401a as the refrigerant. That is, an embodiment is understood that the minimum thickness is suggested with a margin as one example. If the minimum thickness is greater than the calculated minimum thickness, the margin may vary based on the safety factor.

Particularly, in case of the same outer diameter (φ7.94) in Table 4, it is confirmed that the applicable pipe thickness according to an embodiment is 0.50 mm, and the applicable pipe thickness according to Comparative Example is 0.622 mm. That is, when a pipe designed to have the same outer diameter is provided as the ductile stainless steel pipe described in the embodiment, it means that the thickness of the pipe may be further reduced, and also this means that an inner diameter of the pipe may further increase.

Since the outer diameter of the suction pipe 171 is 25.40 mm, a minimum thickness of the suction pipe 171 is 0.85 mm in the case of ASME B31.1 and 0.65 mm in the case of JIS B 8607. In the case of the embodiment to which a margin is applied, the minimum thickness of the suction pipe 171 may be formed to 1.00 mm.

Thus, a limit thickness value, which is applicable to the suction pipe 171, of the above criteria is 0.65 mm on the basis of JIS B 8607. As a result, the suction pipe 171 may have an inner diameter of 24.10 mm (=25.4−0.65×2) or less.

Also, since the outer diameter of the discharge pipe 172 is 19.05 mm, a minimum thickness of the discharge pipe 172 is 0.69 mm in the case of ASME B31.1 and 0.49 mm in the case of JIS B 8607. In the case of the embodiment to which a margin is applied, the minimum thickness of the discharge pipe 172 may be formed to 0.80 mm.

Thus, a limit thickness value, which is applicable to the discharge pipe 172, of the above criteria is 0.49 mm on the basis of JIS B 8607. As a result, the discharge pipe 172 may have an inner diameter of 18.07 mm (=19.05−2×0.49) or less.

In summary, the outer diameter of the pipe used for the compressors 110 and 112 according to the present embodiment may be determined according to the refrigeration capacity of the compressor or the air-conditioning capacity of the gas heat pump system 10, and the design pressure may be determined according to the refrigerant used.

When the suction pipe and the discharge pipe are provided as a flexible stainless steel pipe as in the embodiment, the allowable stress of stainless steel is larger than that of copper. Therefore, when this is applied to Equation 1, the thickness of the pipe may be reduced. That is, the allowable stress may be increased by using the ductile stainless steel pipe having relatively high strength or hardness. Accordingly, thickness reduction at the same outer diameter of the pipe may be realized.

Therefore, even when the ductile stainless steel pipe according to the present embodiment is designed to have the same outer diameter as the conventional copper pipe, the inner diameter may be designed to be larger, and thus, the flow resistance of the refrigerant may be reduced and the circulation efficiency of the refrigerant may be improved.

Figure 5:
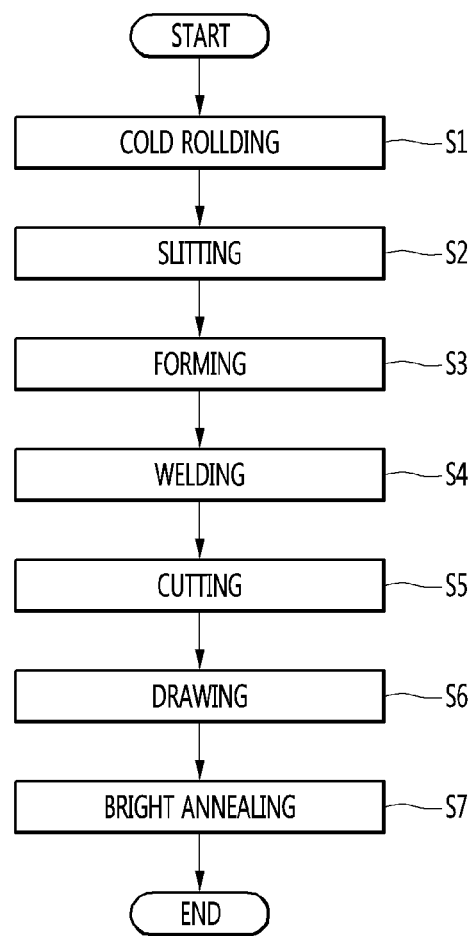
FIG. 5 is a flowchart illustrating a method for manufacturing the ductile stainless steel pipe according to an embodiment.
Figure 6:
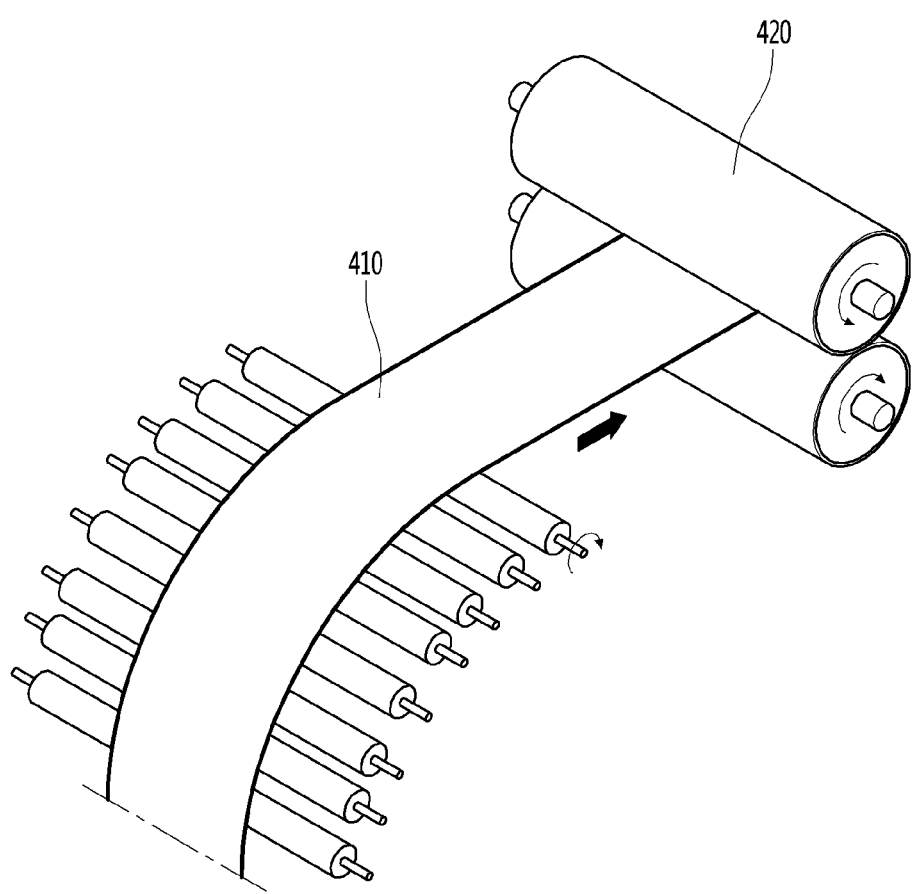
FIG. 6 is a schematic view of a cold rolling process (S1) of FIG. 5.
Figure 7:
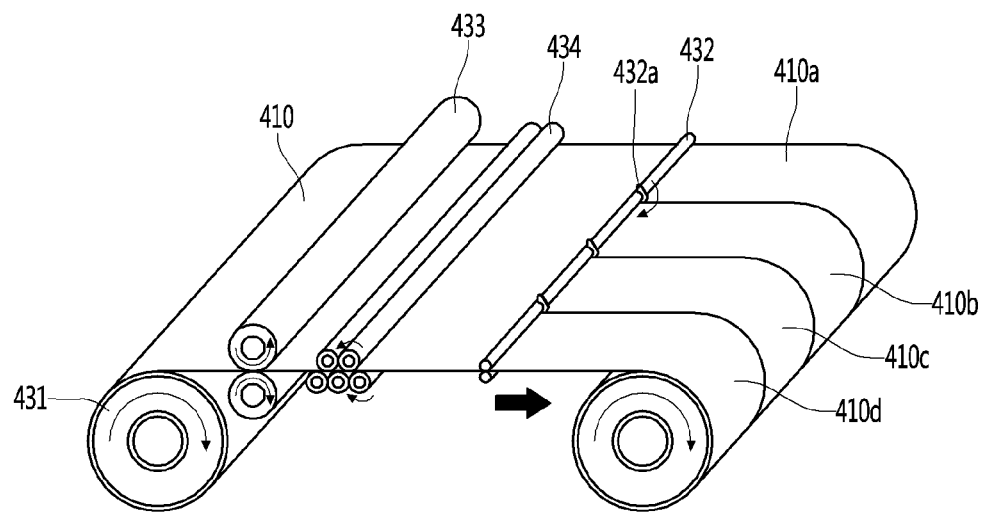
FIG. 7 is a schematic view of a slitting process (S2) of FIG. 5.
Figure 8:
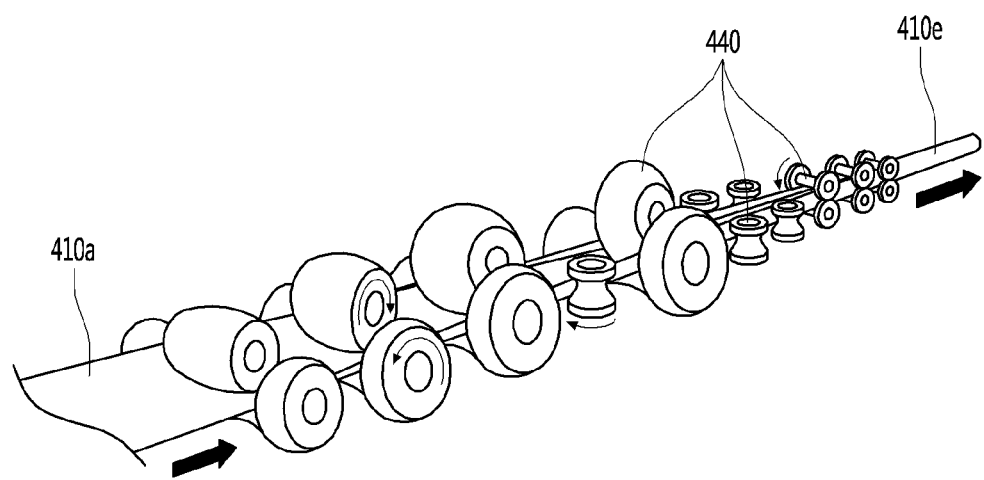
FIG. 8 is a schematic view of a forming process (S3) of FIG. 5.
Figure 11:
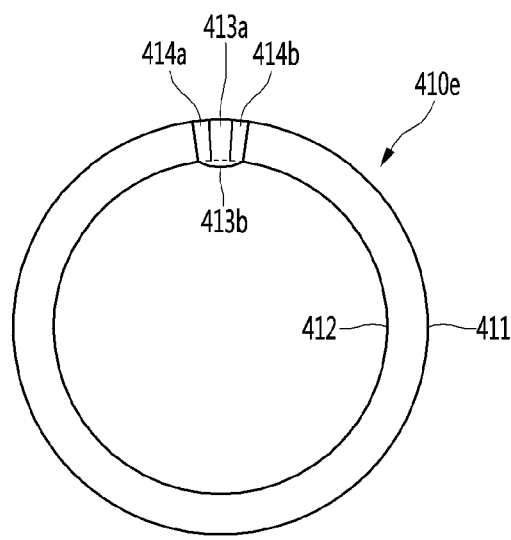
Figure 12:
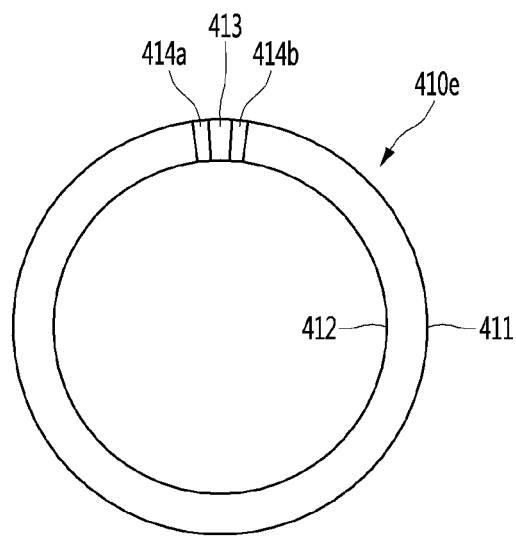
Figure 13:
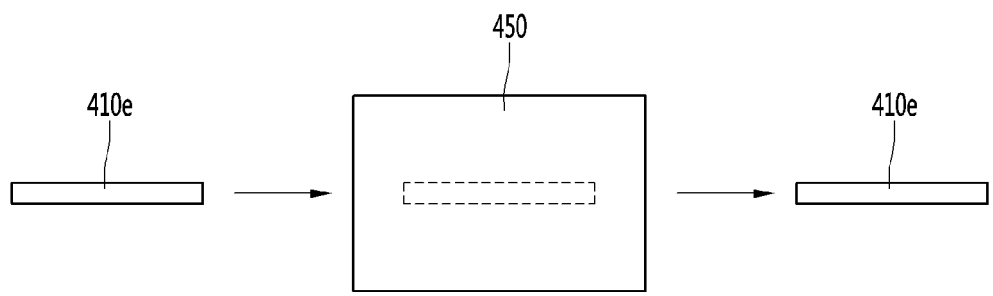
FIG. 13 is a schematic view of a bright annealing process (S7) of FIG. 5.

FIG. 5 is a flowchart illustrating a method for manufacturing the ductile stainless steel pipe according to an embodiment, FIG. 6 is a schematic view of a cold rolling process S1 of FIG. 5, FIG. 7 is a schematic view of a slitting process S2 of FIG. 5, FIG. 8 is a schematic view of a forming process S3 of FIG. 5, FIGS. 9 to 12 are cross-sectional views illustrating a process of manufacturing a ductile stainless steel pipe according to the manufacturing method of FIG. 5, and FIG. 13 is a schematic view of a bright annealing process of FIG. 5.

As described above, since the stainless steel according to the related art has strength and hardness grater than those of copper and thus has a limitation of workability. Particularly, there is a limitation that the stainless steel is limited in bending.

[Required Property of Ductile Stainless Steel Pipe]

To solve these limitations, since the ductile stainless steel pipe according to an embodiment has a composition containing copper, a matrix structure made of austenite, and an average grain size of 30 μm to 60 μm, the ductile stainless steel pipe may have strength and hardness less than those of the stainless steel pipe according to the related art.

Particularly, the austenite has low resistive abdominal strength and low hardness properties when compared to ferrite or martensite. Thus, to manufacture the ductile stainless steel pipe having the properties of the low strength and the low hardness required in this embodiment, it is required to have an austenite matrix structure of 99% or more and a delta ferrite matrix structure of 1% or less on the base of the grain area of the ductile stainless steel pipe.

For this, the ductile stainless steel pipe may have austenite matrix structure of 99% or more and the delta ferrite matrix structure of 1% or less on the base of the grain area of the ductile stainless steel pipe by applying the composition ratio and performing an additional heat treatment.

[Heat Treatment Process of Ductile Stainless Steel Pipe]

A heat treatment process of the ductile stainless steel pipe will be described in detail.

Unlike that the pipe made of copper is manufactured by a single process such as drawing, it is difficult to manufacture the pipe made of the ductile stainless steel through a single process because of having strength and hardness greater than those of copper.

The heat treatment process of the ductile stainless steel pipe according to an embodiment may include a cold rolling process S1, a slitting process S2, a forming process S3, a welding process S4, a cutting process S5, a drawing process S6, and a bright annealing process S7.

[First Process: Cold Rolling Process S1]

The cold rolling process S1 may be understood as a process for rolling the ductile stainless steel provided in the casting process by passing through two rotating rolls at a temperature below a recrystallization temperature. That is, in the cold-rolled ductile stainless steel, unevenness or wrinkles on a surface of a thin film may be corrected, and surface gloss may be given on the surface.

As illustrated in FIG. 6, the ductile stainless steel is provided in the form of a sheet 410, and the sheet 410 is provided to be wound in a coil shape by an uncoiler.

The sheet 410 may receive continuous force by passing between the two rotating rolling rolls 420 disposed in a vertical direction, and thus the sheet 410 may be widened in surface area and thinned in thickness. In this embodiment, the ductile stainless steel is provided in the form of a sheet having a thickness of 1.6 mm to 3 mm in the casting process, and the sheet may be cold-worked to a sheet having a thickness of 1 mm or less through the cold rolling process S1.

[Second Process: Slitting Process S2]

The slitting process S2 may be understood as a process of cutting the cold-worked sheet 410 into a plurality of pieces having a desired width by using a slitter. That is, the single sheet 410 may be cut and worked into a plurality of pieces through the slitting process S2.

As illustrated in FIG. 7, the cold-worked sheet 410 may pass through the slitter 432 while the wound coil is unwound by the rotation of the uncoiler 431 in the state in which the sheet 410 is wound in a coil shape around an outer circumferential surface of the uncoiler 431.

For example, the slitter 432 may include a shaft that is disposed in the vertical direction of the sheet 410 and a rotational cutter 432a coupled to the shaft. The rotational cutter 432a may be provided in plurality, and the plurality of rotational cutters 432 may be spaced apart from each other in a width direction of the sheet 410. Spaced distances between the plurality of rotational cutters 432a may be the same or different from each other in some cases.

Thus, when the sheet 410 passes through the slitter 432, the single sheet 410 may be divided into a plurality of sheets 410a, 410b, 410c, and 410d by the plurality of rotational cutters 432a. In this process, the sheet 410 may have a suitable diameter or width of the refrigerant pipe to be applied. Here, the sheet 410 may be pressed by a plurality of support rollers 433 and 434 arranged in the vertical direction so as to be precisely cut by the slitter 432.

When the slitting process S2 is completed, a bur may be formed on an outer surface of the sheet 410, and the bur needs to be removed. If the bur remains on the outer surface of the sheet 410, welding failure may occur in a process of welding the pipe worked in the form of the sheet 410 to the other pipe, and the refrigerant may leak through a poor welding portion. Accordingly, when the slitting process S2 is completed, a polishing process for removing the bur needs to be additionally performed.

[Third Process: Forming Process S3]

The forming process S3 may be understood as a process of molding the ductile stainless steel in the form of a sheet 410a by passing through multi-staged molding rolls 440 to manufacture the ductile stainless steel in the form of a pipe 410a.

As illustrated in FIG. 8, in the state that the sheet 410a is wound in the form of the coil on the outer circumferential surface of the uncoiler, the coil wound by the rotation of the uncoiler is unwound to enter into the multi-staged forming rolls 440 that alternately disposed in the vertical or horizontal direction. The sheet 410a entering into the multi-staged molding rolls 440 may successively pass through the molding rolls 440 and thus be molded in the form of a pipe 410e of which both ends are adjacent to each other.

Figure 9:
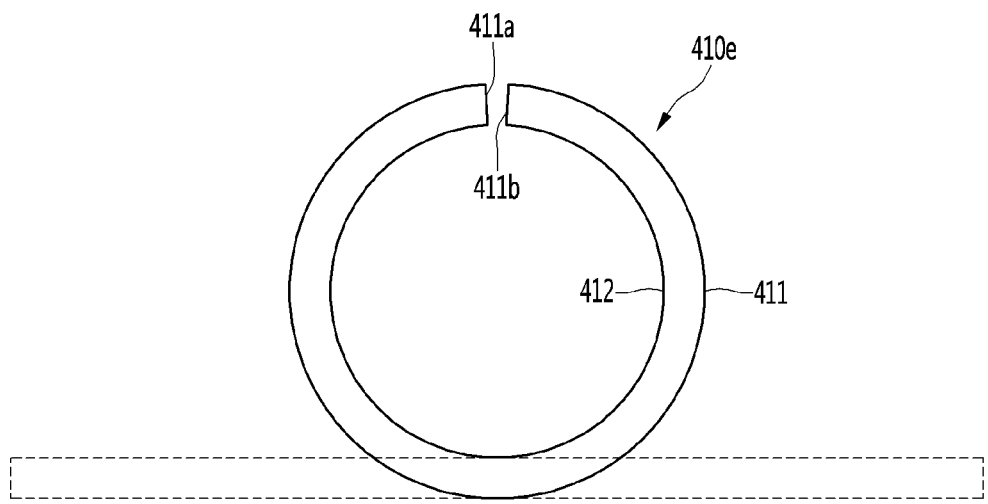
FIGS. 9 to 12 are cross-sectional views illustrating a process of manufacturing a ductile stainless steel pipe according to the manufacturing method of FIG. 5.

FIG. 9 illustrates a shape in which the ductile stainless steel having the sheet shape is rolled and then molded in the form of a pipe 10e. That is, the ductile stainless steel having the form of the sheet 10a may be molded into a pipe 410e, of which both ends 411a and 411b approach each other, through the forming process S3.

[Fourth Process: Welding Process S4]

The welding process S4 may be understood as a process of bonding both the ends 411a and 411b of the pipe 410e, which approach each other by being rolled by the forming process S3, to manufacture a welded pipe. In the welding process S4, the welded pipe may be realized by butt-welding both ends facing each other through a melting welding machine, for example, a general electric resistance welding machine, an argon welding machine, or a high-frequency welding machine.

Figure 10:
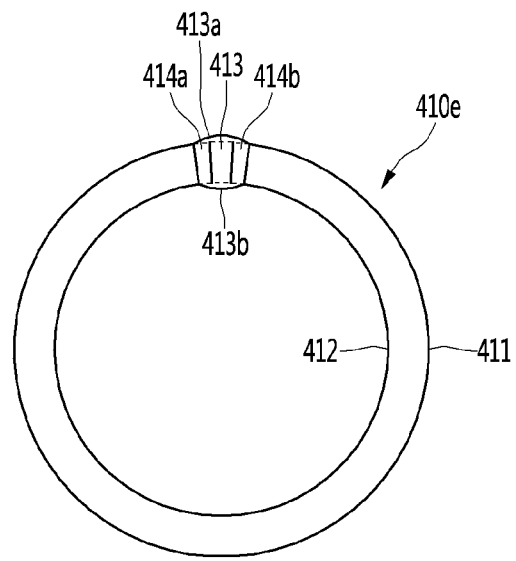

FIG. 10 illustrates a pipe manufactured by rolling and welding a sheet made of ductile stainless steel. Particularly, both the ends 411a and 411b of the pipe 410e may be welded in a longitudinal direction of the pipe 410e to bond both the ends 411a and 411b to each other.

Here, in the welding process, a weld zone 413 is formed in the longitudinal direction of the pipe 410e. As illustrated in FIG. 10, since beads 413a and 413b that slightly protrude from an inner circumferential surface 412 and an outer circumferential surface 411 of the pipe 410e are formed at the weld zone 413, each of the inner circumferential surface 412 and the outer circumferential surface 411 of the pipe 410e does not have a smooth surface.

Heat-affected zones 414a and 414b may be further formed on both sides of the weld zone 413 by heat during the welding process. The heat-affected zones 414a and 414b may also be formed in the longitudinal direction of the pipe 410e, like the weld zone 413.

[Fifth Process: Cutting Process S5]

The cutting process S5 may be understood as a process of partially cutting the bead 413a of the weld zone 413 so that the outer circumferential surface 411 of the pipe 410e has the smooth surface. The cutting process S5 may be continuous with the welding process S4.

For example, the cutting process S5 may include a process of partially cutting the bead 413a using a bite while moving the pipe in the longitudinal direction through press bead rolling.

FIG. 11 illustrates a ductile stainless steel pipe in which the cutting process S5 is finished. That is, the bead 413a formed on the outer circumferential surface 411 of the pipe 410e may be removed through the cutting process S5. In some cases, the cutting process S5 may be performed together with the welding process S4, whereas the cutting process S5 may be omitted.

[Sixth Process: Drawing Process S6]

The drawing process S6 may be understood as a process of applying external force to the bead 413b of the weld zone 413 so that the outer circumferential surface 411 of the pipe 410e has the smooth surface.

For example, the drawing process S6 may be performed by using a drawer including dies having a hole with an inner diameter less than an outer diameter of the pipe 410e manufactured through the forming process S3 and the welding process S4 and a plug having an outer diameter with an outer diameter less than an inner diameter of the pipe 410e manufactured through the forming process S3 and the welding process S4.

Particularly, the pipe 410e in which the welding process S4 and/or the cutting process S5 are performed may pass through the hole formed in the dies and the plug. Here, since the bead 413a formed on the outer circumferential surface 411 of the pipe 410e protrudes outward from a center of the outer circumferential surface 411 of the pipe 410e, the bead 413a may not pass through the hole of the dies and thus be removed while being plastic-deformed.

Similarly, since the bead 413b formed on the inner circumferential surface 412 of the pipe 410e protrudes toward the center of the inner circumferential surface 412 of the pipe 410e, the bead 413b may not pass through the plug and thus be removed while being plastic-deformed.

That is, as described above, the welded beads 413a and 413b formed on the inner circumferential surface 412 and the outer circumferential surface 411 of the pipe 410e may be removed through the drawing process S6. Also, since the welded bead 413a on the inner circumferential surface 412 of the pipe 410e is removed, it is possible to prevent a protrusion from being formed on the inner circumferential surface 412 of the pipe 410e when the pipe 410e is expanded for the refrigerant pipe.

FIG. 12 illustrates a ductile stainless steel pipe in which the drawing process S6 is finished. That is, the beads 413a and 413b formed on the inner and outer circumferential surfaces 412 and 411 of the pipe 410e may be removed through the drawing process S6.

The reason for forming the outer and inner circumferential surfaces 411 and 412, which have the smooth surfaces, of the pipe 410e is for forming the uniform inner diameter of the pipe 410e and easily connecting the pipe to the other pipe. Also, the reason for forming the uniform inner diameter in the pipe 410e is for maintaining a smooth flow of the refrigerant and a constant pressure of the refrigerant. Although not shown, after the drawing process S6, a groove (not shown) may be formed on the outer and inner circumferential surfaces 411 and 412 of the pipe 410e through mechanical working.

[Seventh Process: Bright Annealing Process S7]

The bright annealing process S7 may be understood as a process for heating the pipe 410e from which the welded beads are removed to remove heat history and residual stress remaining in the pipe 410e. In this embodiment, the austenite matrix structure of 99% or more and the delta ferrite matrix structure of 1% or less are formed based on the grain area of the ductile stainless steel, and also, to increase the average grain size of the ductile stainless steel to 30 μm to 60 μm, the heat treatment process is performed.

Particularly, the average grain diameter (or the grain size number) of the ductile stainless steel is a key factor in determining the low strength and low hardness properties of the stainless steel. Particularly, the bright annealing process S7 is performed by annealing the pipe 410e, from which the welded beads are removed, in a stream of a reducing or non-oxidizing gas and cooling the annealed pipe 410e as it is after the annealing.

As illustrated in FIG. 13, the pipe 410e from which the welded beads are removed passes through an annealing furnace 450 at a constant speed. The inside of the annealing furnace 450 may be filled with an atmospheric gas, and also, the inside of the annealing furnace 450 may be heated at a high temperature by using an electric heater or a gas burner.

That is, the pipe 410 may receive a predetermined heat input while passing through the annealing furnace 450. Accordingly, the ductile stainless steel may have the austenite matrix structure and the average grain size of 30 μm to 60 μm due to the heat input.

The heat input represents a heat amount entering into a metal member. Also, the heat input plays a very important role in metallographic microstructure control. Thus, in this embodiment, a heat treatment method for controlling the heat input is proposed.

In the bright annealing process S7, the heat input may be determined according to a heat treatment temperature, an atmospheric gas, or a transfer speed of the pipe 410e.

In case of the bright annealing process S7 according to this embodiment, the heat treatment temperature is 1,050° C. to 1,100° C., the atmospheric gas is hydrogen or nitrogen, and the transfer speed of the pipe 410e is 180 mm/min to 220 mm/min. Thus, the pipe 410e may pass through the annealing furnace 450 at a transfer speed of 180 mm/min to 220 mm/min at an annealing heat treatment temperature of 1,050° C. to 1,100° C. in the annealing furnace 450.

Here, if the annealing heat treatment temperature is less than 1,050° C., sufficient recrystallization of the ductile stainless steel does not occur, the fine grain structure is not obtained, and the flattened worked structure of the grain is generated to reduce creep strength. On the other hand, if the annealing temperature exceeds 1,100° C., high-temperature intercrystalline cracking or ductility deterioration may occur.

Also, when the pipe 410e from which the welded beads are removed passes through the annealing furnace 450 at a transfer speed of less than 180 mm/min, the productivity is deteriorated due to a long time. On the other hand, when the pipe 410e passes through the annealing furnace 450 at a transfer speed exceeding 172 mm/min, the stress existing in the ductile stainless steel is not sufficiently removed, and also the average grain size of the austenite matrix structure is less than 30 μm. That is, if the transfer speed of the pipe 410e is too high, the average grain size of the ductile stainless steel is less than 30 μm, and the low strength and low hardness properties required in the this embodiment may not be obtained.

As described above, the ductile stainless steel pipe according to an embodiment, which is manufactured through the cold rolling process S1, the slitting process S2, the forming process S3, the welding process S4, the cutting process S5, the drawing process S6, and the bright annealing process S7 may be temporarily stored in a coiled state by a spool or the like and then be shipped.

Although not shown, after the bright annealing process S7 is completed, shape correction and surface polishing processing may be further performed.

<Fatigue Failure Test>

Figure 14:
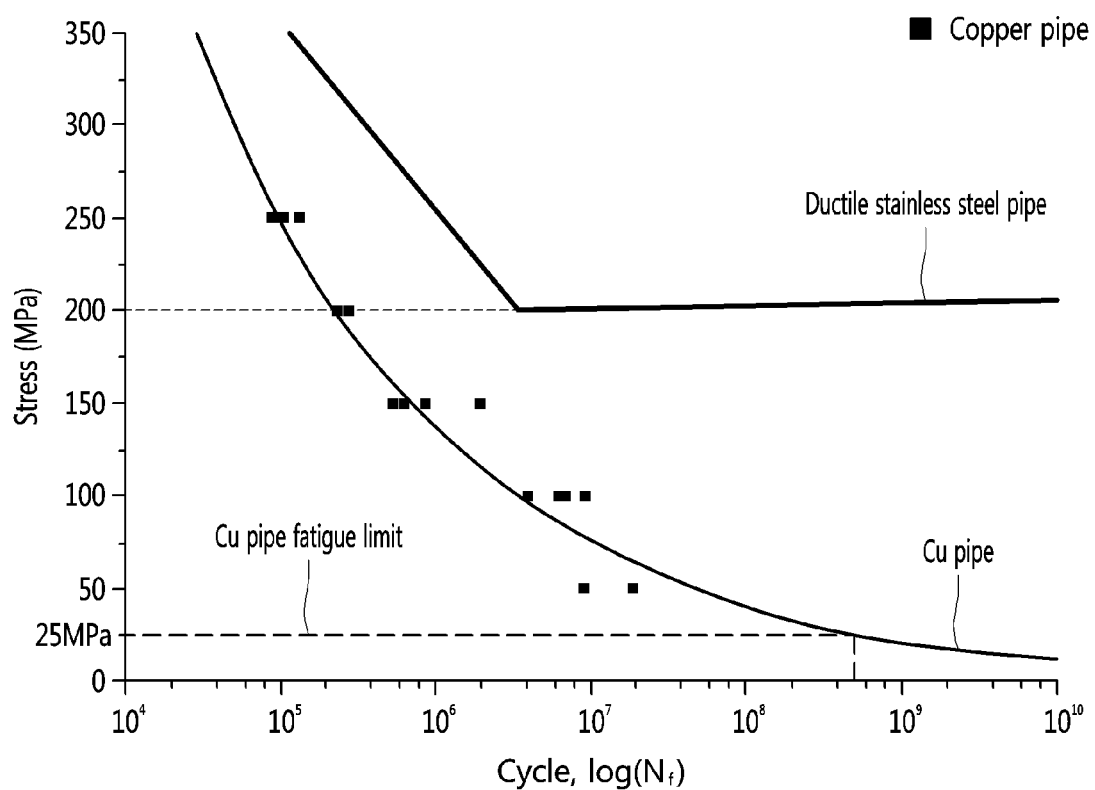
FIG. 14 is a graph illustrating result values obtained through an S-N curve test for comparing fatigue limits of the ductile stainless steel pipe according to an embodiment and a copper pipe according to the related art.
Figure 15:
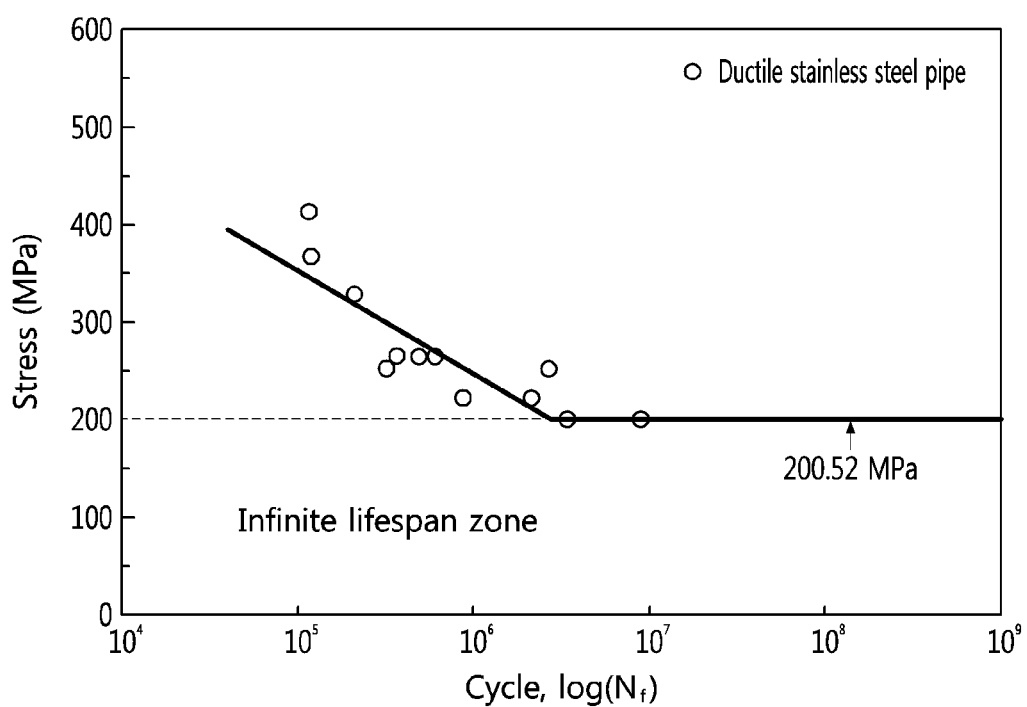
FIG. 15 is a graph illustrating an S-N curve teat of the ductile stainless steel pipe according to an embodiment.

FIG. 14 is a graph illustrating result values obtained through an S-N curve test for comparing fatigue limits of the ductile stainless steel pipe according to an embodiment and a copper pipe according to the related art, and FIG. 15 is a graph illustrating an S-N curve teat of the ductile stainless steel pipe according to an embodiment.

Referring to FIGS. 14 and 15, the ductile stainless steel pipe according to an embodiment has a fatigue limit (or endurance limit) of about 200.52 MPa. This is a value greater by about 175 MPa (8 times) than the copper pipe according to the related art having a fatigue limit of 25 MPa. That is, the ductile stainless steel pipe may have improved durability, reliability, life expectancy, and freedom in design when compared to the copper pipe according to the related art. Hereinafter, effects of the ductile stainless steel pipe will be described in more detail.

[Maximum Allowable Stress]

The ductile stainless steel pipe may be determined in maximum allowable stress value on the basis of the fatigue limit value. For example, the maximum allowable stress of the ductile stainless steel pipe may be set to 200 MPa when the gas heat pump system 10 is started or stopped and may be set to about 90 MPa when the gas heat pump system 10 is in operation. The reason in which the maximum allowable stress has a small value during the operation of the gas heat pump system 10 may be understood as reflecting the stress due to the refrigerant flowing in the pipe in the operation state.

The maximum allowable stress represents a maximum stress limit that may be allowed to safely use a pipe or the like. For example, the pipe and the like may receive external force during use, and stress may be generated in the pipe due to the external force. Here, when the internal stress is equal to or greater than a certain critical stress value determined by a factor such as a solid material, the pipe may be permanently deformed or broken. Therefore, the maximum allowable stress may be set to safely use the pipe.

[Fatigue Limit]

When repeated stress is applied continuously to a solid material such as steel, the solid material may be broken at stress much lower than tensile strength. This is called fatigue of the material, and a failure due to the fatigue is called fatigue failure. The fatigue of the material occurs when the material undergoes a repeated load. Also, the material may be broken eventually when beyond a certain limit due to the repeated load. Here, an endurance limit in which the material is not broken even under repeated load is defined as a fatigue limit endurance limit.

[Relationship Between Fatigue Limit and S-N Curve]

An S-N curve shows the number of repetitions (N, cycles) until certain stress is repeated. In detail, the solid material is destroyed more quickly if it is subjected to repeated stress several times, and the number of repetitions of stress till the failure is affected by the amplitude of the applied stress. Thus, effects due to the degree of stress and the number of repetitions of stress until the solid material is broken may be analyzed through the S-N curve.

In the S-N curve test graph of FIGS. 14 and 15, a vertical axis represents a stress amplitude (Stress), and a horizontal axis represents a log value of the repetition number. Also, the S-N curve is a curve drawn along the log value of the number of repetitions until the material is destroyed when the stress amplitude is applied. In general, the S-N curve of the metal material increases as the stress amplitude decreases, the number of repetitions till the fracture increases. Also, when the stress amplitude is below a certain value, it is not destroyed even if it repeats infinitely. Here, the stress value at which the S-N curve becomes horizontal represents the fatigue limit or endurance limit of the above-mentioned material.

[Fatigue Limit Limitation of Copper Pipe]

In the S-N curve of the copper pipe according to the related art, which is based on fatigue failure test data of the copper pipe of FIG. 14 according to the related art, it is seen that the fatigue limit of the copper pipe according to the related art is about 25 MPa. That is, maximum allowable stress of the copper pipe is 25 MPa. However, a case in which the stress of the pipe has a value of about 25 Mpa to about 30 MPa when the gas heat pump system 10 is started or stopped may occur according to an operation state or condition of the gas heat pump system 10. As a result, the copper pipe according to the related art has a limitation that the lifetime of the pipe is shortened, and the durability is deteriorated due to the stress value exceeding the degree of fatigue as described above.

[Effect of Ductile Stainless Steel Pipe]

Referring to FIGS. 14 and 15, in the SN curve according to this embodiment, which is based on the fatigue failure test data of the ductile stainless steel pipe, the fatigue limit of the ductile stainless steel pipe is about 200.52 MPa, which is greater 8 times than that of the copper stainless steel pipe. That is, maximum allowable stress of the ductile stainless steel pipe is about 200 MPa. The stress in the pipe provided in the gas heat pump system 10 does not exceed the maximum allowable stress of the ductile stainless steel pipe even when considering the maximum operation load of the gas heat pump system 10. Accordingly, when the ductile stainless steel pipe is used in a gas heat pump system 10, the lifespan of the pipe may be prolonged, and the durability and the reliability may be improved.

The ductile stainless steel pipe has a design margin of about 175 MPa when compared to the fatigue limit of the copper pipe. In detail, the outer diameter of the ductile stainless steel pipe is the same as the outer diameter of the copper pipe according to the related art, and the inner diameter may be expanded.

That is, a minimum thickness of the ductile stainless steel pipe may be less than that of the copper pipe, and even in this case, maximum allowable stress may be greater than that of the copper pipe due to the relatively high design margin. As a result, there is an effect that the degree of freedom in designing the ductile stainless steel pipe is improved.

<Stress Measurement Test>

Stress more than the fatigue limit of the copper pipe according to the related art may be generated in the pipe according to the operation conditions of the gas heat pump system 10. On the other hand, when the ductile stainless steel pipe is used in a gas heat pump system 10, the maximum stress value generated in the ductile stainless steel pipe does not reach the fatigue limit of the ductile stainless steel pipe. Hereinafter, this will be described in detail.

<Improvement of Performance (COP)>

FIG. 16 is a graph illustrating result values obtained through a test for comparing pressure losses within the pipes when each of the ductile stainless steel pipe according to an embodiment and the copper pipe according to the related art is used as a gas pipe, and FIG. 17 is a test result table illustrating performance of the ductile stainless steel pipe according to an embodiment and the copper pipe according to the related art.

The gas pipe may be understood as a pipe for guiding a flow of an evaporated low-pressure gas refrigerant or a compressed high-pressure gas refrigerant on the basis of the refrigerant cycle.

In more detail, FIGS. 16(a) and 17(a) are test graphs in the standard pipe (5 m), and FIGS. 16(b) and 17(b) are test graphs in the long pipe (50 m).

[Comparison of Pressure Loss in Pipe]

Referring to FIGS. 16(a) and 16(b), a vertical axis of the graph represents a pressure change amount or a pressure loss amount (ΔP=Pin-Pout, Unit KPa) in the gas pipe, and a horizontal axis represents the cooling mode or the heating mode of the gas heat pump system.

As described above, the ductile stainless steel pipe according to an embodiment is significantly improved in durability and degree of design freedom when compared to the copper pipe according to the related art. Therefore, the ductile stainless steel pipe has the same outer diameter as the copper pipe and may have an inner diameter expanded more than the copper pipe. The ductile stainless steel pipe may decrease in flow resistance and increase in flow rate of the refrigerant when compared to the copper pipe due to the expanded inner diameter. Also, the ductile stainless steel pipe may be reduced in pressure loss in the pipe when compared to the copper pipe according to the related art.

[Comparison of Pressure Loss in Standard Pipe]

Referring to FIG. 16(a), the pressure loss with the pipe of the gas pipe is formed so that the pressure loss of the ductile stainless steel pipe is less by about 2.3 KPa than that of the copper pipe according to the related art with respect to the standard pipe having a length of about 5 m. In detail, in the cooling mode, a pressure loss (ΔP) of the ductile stainless steel pipe is about 6.55 KPa, and a pressure loss (ΔP) of the copper pipe is about 8.85 KPa. That is, in the cooling mode of the standard pipe (5 m), the pressure loss of the ductile stainless steel pipe is less by about 26% than that of the copper pipe.

Also, the pressure loss (ΔP) of the ductile stainless steel pipe is less by about 1.2 KPa than that (ΔP) of the copper pipe according to the related art in the heating mode of the standard pipe (5 m). That is, in the heating mode, a pressure loss (ΔP) of the ductile stainless steel pipe is about 3.09 KPa, and a pressure loss (ΔP) of the copper pipe is about 4.29 KPa. That is, in the heating mode of the standard pipe (5 m), the pressure loss of the ductile stainless steel pipe is less by about 28% than that of the copper pipe.

[Comparison of Pressure Loss in Long Pipe]

Referring to FIG. 16(b), the pressure loss with the pipe of the gas pipe is formed so that the pressure loss of the ductile stainless steel pipe is less by about 16.9 KPa than that of the copper pipe according to the related art with respect to the long pipe having a length of about 50 m. That is, in the cooling mode, a pressure loss (ΔP) of the ductile stainless steel pipe is about 50.7 KPa, and a pressure loss (ΔP) of the copper pipe is about 67.6 KPa. That is, in the cooling mode of the long pipe (50 m), the pressure loss of the ductile stainless steel pipe is less by about 26% than that of the copper pipe.

Also, the pressure loss (ΔP) of the ductile stainless steel pipe is less by about 10.2 KPa than that (ΔP) of the copper pipe according to the related art in the heating mode of the long pipe (50 m). That is, in the heating mode, a pressure loss (ΔP) of the ductile stainless steel pipe is about 29.03 KPa, and a pressure loss (ΔP) of the copper pipe is about 39.23 KPa. That is, in the heating mode of the long pipe (50 m), the pressure loss of the ductile stainless steel pipe is less by about 26% than that of the copper pipe.

[Coefficient of Performance]

A refrigerant pressure loss may occur in the gas pipe and the suction pipe 171 or the discharge pipe 172 of the compressors 110 and 112. The refrigerant pressure loss causes an adverse effect such as decrease in refrigerant circulation amount, decrease in volume efficiency, increase in compressor discharge gas temperature, increase in power per unit refrigeration capacity, and decrease in coefficient of performance (COP).

Therefore, as illustrated in FIG. 16, when the gas pipe, the suction pipe, or the discharge pipe is provided as the ductile stainless steel pipe, the pressure loss in the pipe may be reduced when compared to the copper pipe according to the related art, a compressor work of the compressor (e.g., power consumption (kW)) may decrease, and the coefficient of performance (COP) may increase.

[Comparison of Coefficient of Performance in Standard Pipe]

Referring to FIG. 17(a), the cooling capacity is about 9.36 kW for the copper pipe and about 9.45 kW for the ductile stainless steel pipe in the cooling mode of the standard pipe (5 m). That is, the heat quantity Q of the ductile stainless steel pipe is greater by about 100.9% than that of the copper pipe. Also, the power consumption is about 2.07 kW for the copper pipe and about 2.06 kW for the ductile stainless steel pipe. Therefore, since the COP is about 4.53 in the copper pipe and about 4.58 in the ductile stainless steel pipe, the ductile stainless steel pipe is improved to about 100.9% of the copper pipe according to the related art.

Also, in the heating mode of the standard pipe (5 m), the heating capacity is about 11.28 kW for the copper pipe and about 11.31 kW for the ductile stainless steel pipe. That is, the heat quantity Q of the ductile stainless steel pipe is greater by about 100.2% than that of the copper pipe. Also, the power consumption is about 2.55 kW for the copper pipe and about 2.55 kW for the ductile stainless steel pipe. Therefore, since the COP is 4.43 in the copper pipe and 4.44 in the ductile stainless steel pipe, the ductile stainless steel pipe is improved to about 100.2% of the copper pipe according to the related art.

[Comparison of Coefficient of Performance in Long Pipe]

The improvement of the efficiency (performance coefficient) due to the reduction of the pressure loss on the pipe is more evident in the pipe (50 m) than the standard pipe (5 m). That is, as the length of the pipe becomes longer, the performance of the ductile stainless steel pipe improved when compared to the copper pipe according to the related art may be further improved.

Referring to FIG. 17(b), the cooling capacity is about 7.77 kW for the copper pipe and about 8.03 kW for the ductile stainless steel pipe in the cooling mode of the long pipe (5 m). That is, the heat quantity Q of the ductile stainless steel pipe is greater by about 103.4% than that of the copper pipe. Also, the power consumption is about 2.08 kW for the copper pipe and about 2.08 kW for the ductile stainless steel pipe. Therefore, since the COP is 3.74 in the copper pipe and 3.86 in the ductile stainless steel pipe, the ductile stainless steel pipe is improved to about 103.2% of the copper pipe according to the related art.

Also, in the heating mode of the long pipe (50 m), the heating capacity is about 8.92 kW for the copper pipe and about 9.07 kW for the ductile stainless steel pipe. That is, the heat quantity Q of the ductile stainless steel pipe is greater by about 101.7% than that of the copper pipe. Also, the power consumption is about 2.54 kW for the copper pipe and about 2.53 kW for the ductile stainless steel pipe. Therefore, since the COP is 3.51 in the copper pipe and 3.58 in the ductile stainless steel pipe, the ductile stainless steel pipe is improved to about 102% of the copper pipe according to the related art.

<Corrosion Resistance Test>

Figures 18, 19:
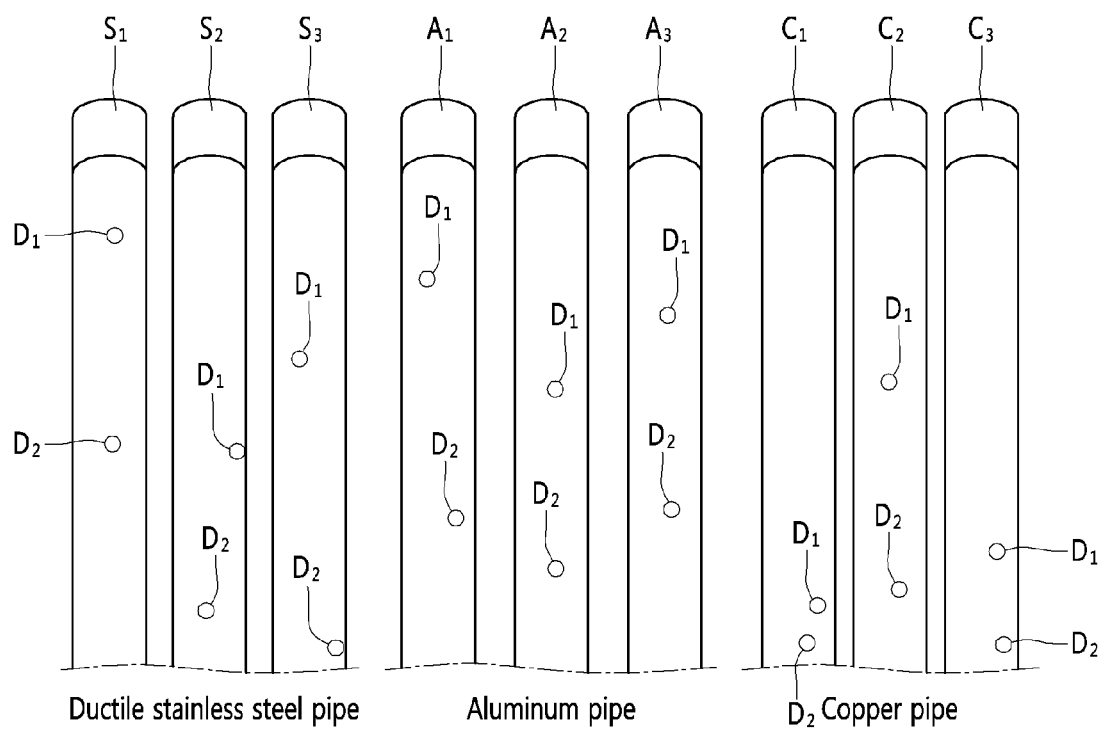
FIG. 18 is a view illustrating a plurality of ductile stainless steel pipes, aluminum (Al) pipes, and copper pipes, which are objects to be tested for corrosion resistance.
FIG. 19 is a table illustrating results obtained by measuring a corrosion depth for each pipe in FIG. 18.
Figure 20:
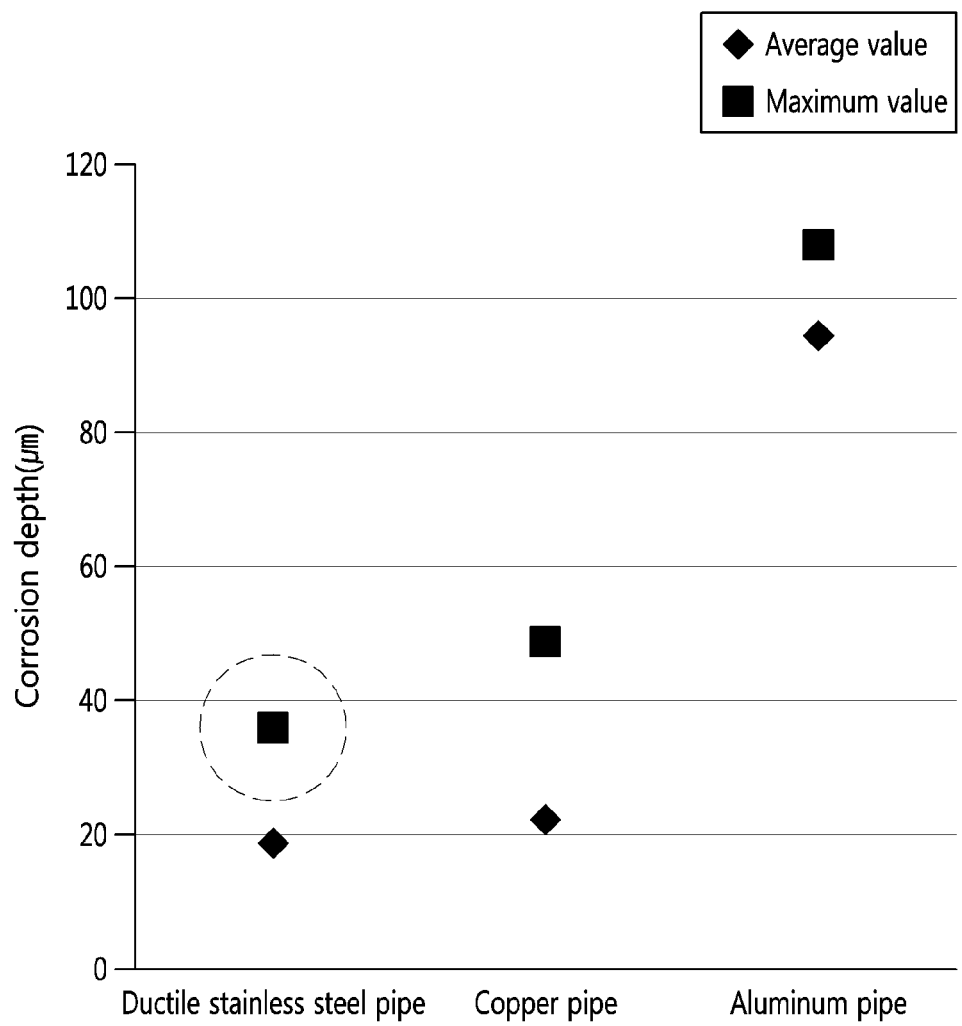
FIG. 20 is a graph illustrating results of FIG. 19.

FIG. 18 is a view illustrating a plurality of ductile stainless steel pipes, aluminum (Al) pipes, and copper pipes, which are objects to be tested for corrosion resistance, FIG. 19 is a table illustrating results obtained by measuring a corrosion depth for each pipe in FIG. 18, and FIG. 20 is a graph illustrating results of FIG. 19.

Corrosion resistance represents a property of a material to withstand corrosion and erosion. It is also called corrosion resistance. In general, stainless steel or titanium is more corrosion resistant than carbon steel because it is not well corroded. The corrosion resistance test includes a salt water spray test and a gas test. The resistance of the product to the atmosphere including the salt may be determined through the corrosion resistance test to examine the heat resistance, the quality and uniformity of the protective coating.

[Complex Corrosion Test]

Referring to FIGS. 18 to 20, when the cyclic corrosion test is performed on the ductile stainless steel pipe according to an embodiment together with comparative groups (Al, Cu) of the other pipe, it is confirmed that the corrosion resistance is the most excellent because the corrosion depth (μm) is the smallest value in comparison with the comparative group. Hereinafter, this will be described in detail.

The cyclic corrosion test represents a corrosion test method in which atmospheres of salt spraying, drying and wetting are repeatedly performed for the purpose of approaching or promoting the natural environment. For example, evaluation may be carried out by setting the test time to be 30 cycles, 60 cycles, 90 cycles, 180 cycles, and the like, with 8 hours of one cycle, 2 hours of spraying with salt, 4 hours of drying, and 2 hours of wetting. The salt spraying test during the complex corrosion test is the most widely used as an accelerated test method for examining the corrosion resistance of plating and is a test for exposing a sample in the spray of saline to examine the corrosion resistance.

Referring to FIG. 18, a plurality of ductile stainless steel pipes S1, S2, and S3, a plurality of aluminum pipes A1, A2, and A3, and a plurality of copper pipes C1, C2, and C3 in which the complex corrosion test is performed, are illustrated, and the corrosion depth (μm) was measured by defining arbitrary positions D1 and D2 in each pipe.

[Test Result and Advantages of Ductile Stainless Steel Pipe]

Referring to FIGS. 19 and 20, the pip measured to have the deepest corrosion depth is the aluminum pipe having an average of 95 μm. Next, the average copper pipe is about 22 μm, and the ductile stainless steel pipe has an average value of 19 μm, which is the most corrosion-resistant measurement value. Also, the maximum value Max of the corrosion depth μm is the deepest of aluminum pipe to about 110 μm, followed by copper pipe to 49 μm, and the soft stainless steel pipe to 36 μm.

Attempts have been made to use the aluminum pipe to replace the copper pipe according to the related art. However, since the corrosion resistance is low as in the above-mentioned test results, there is a great disadvantage that the corrosion resistance is lowest. On the other hand, the ductile stainless steel pipe has the most excellent corrosion resistance and is superior in durability and performance to the pipe according to the related art.

<Bending Test>

In the case of installing a gas heat pump system 10 by connecting pipes to each other according to individual installation environments, the pipe is not only a straight pipe, but also a bent pipe formed by bending external force of a worker installing the pipe. Also, the straight pipe or the bent pipe connects the outdoor unit to the indoor unit.

The stainless steel pipe according to the related art has strength grater than that of the copper pipe. Therefore, due to the high strength of the stainless steel pipe according to the related art, it is very difficult for an operator to apply external force to the pipe to form a bent pipe. Therefore, there has been a limitation that the copper pipe or the aluminum pipe has to be used for the convenience of installation work.

However, the strength of the ductile stainless steel pipe according to an embodiment may be lower than that of the stainless steel pipe according to the related art and may be lowered to a level higher than that of the copper pipe according to the related art. Thus, since the above-mentioned bent pipe or the like may be formed, the low moldability of the stainless steel pipe according to the related art may be solved. Hereinafter, the bending test will be described below in detail.

[Shape of Bent Pipe and Curvature Radius]

Figure 22:
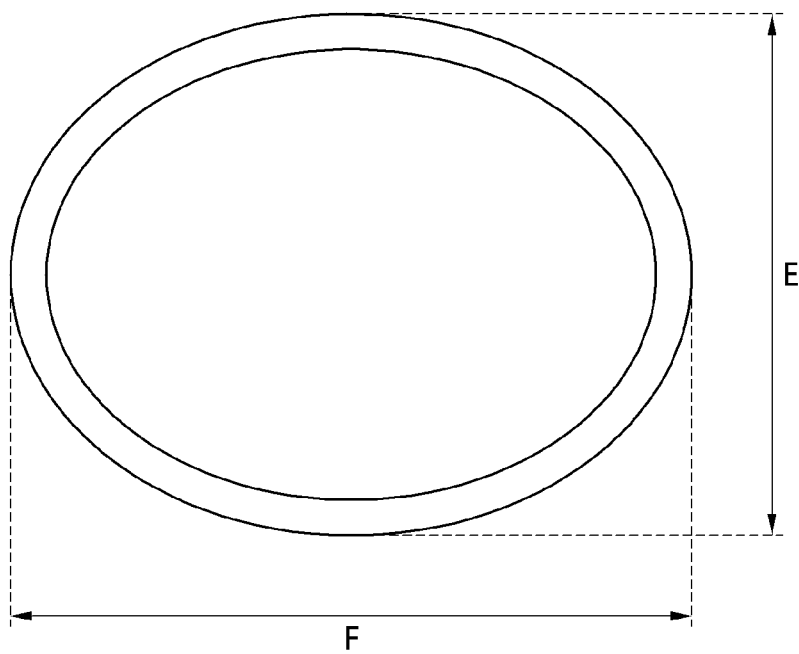
FIG. 22 is a cross-sectional view illustrating a portion of the bent pipe.
Figure 23:
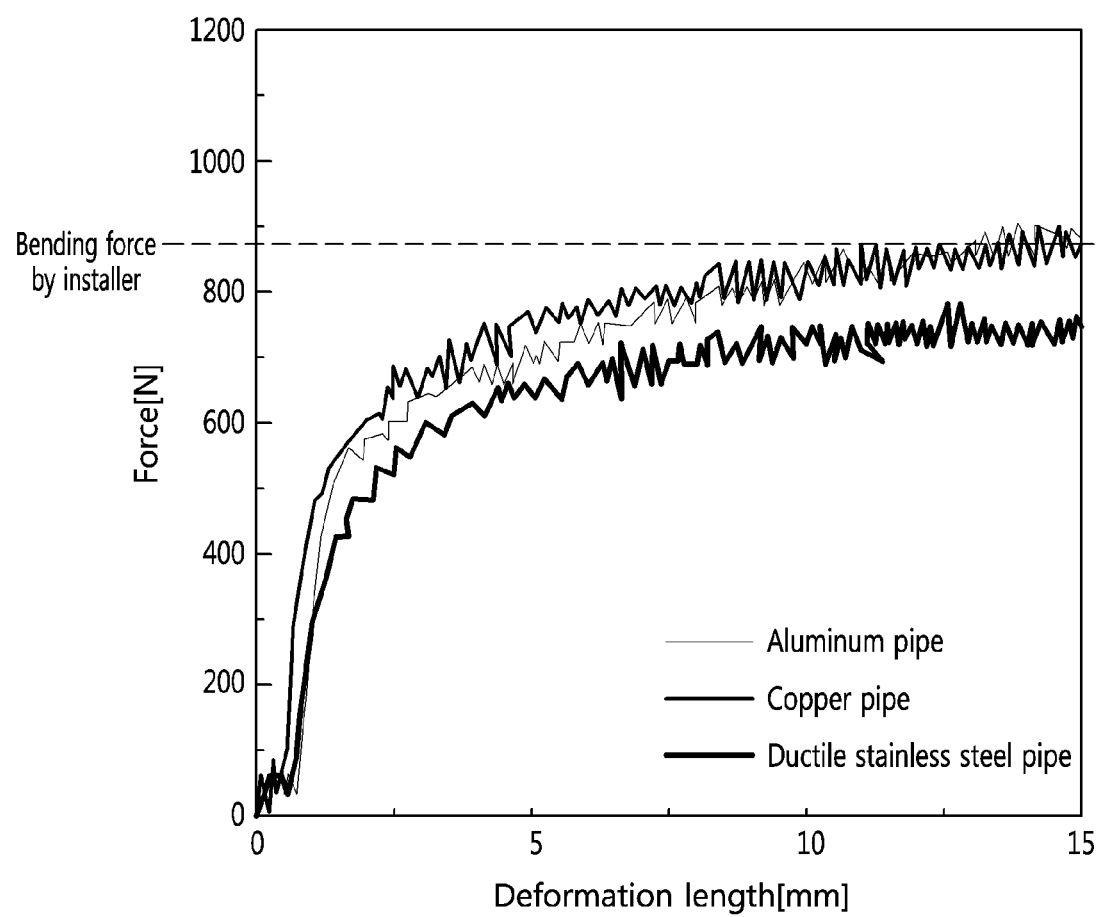
FIG. 23 is a graph illustrating results obtained through a test for comparing bending loads according to deformation lengths of the ductile stainless steel pipe, the copper pipe, and the aluminum pipe.

FIG. 21 is view illustrating a shape in which the ductile stainless steel pipe is bent according to an embodiment, FIG. 22 is a cross-sectional view illustrating a portion of the bent pipe, and FIG. 23 is a graph illustrating results obtained through a test for comparing bending loads according to deformation lengths of the ductile stainless steel pipe, the copper pipe, and the aluminum pipe.

Referring to FIG. 21, the ductile stainless steel pipe according to an embodiment may be bent by bending force. For example, the ductile stainless steel pipe may have an L-shape as illustrated in FIG. 21(a) or an S-shape as illustrated in FIG. 21(b).

Referring to FIGS. 21(a) and 21(b), a central line of the ductile stainless steel pipe may include a curved portion having a curvature so as to be bent in the other direction in one direction. Also, the curve has a curvature radius R.

The curvature radius R is defined as a value indicating a degree of curvature at each point of the curve. The curvature radius R of the ductile stainless steel pipe forming the curved line may include a minimum curvature radius Rmin that may be used in a pipe which does not generate wrinkles even when the straight pipe is formed into a curved line and does not generate vibration. Also, the minimum curvature radius Rmin may be measured in a bent pipe that meets a setting criterion for a ratio of maximum and minimum outside diameters.

[Ratio of Maximum/Minimum Outer Diameters of Ductile Stainless Steel Pipe]

Referring to FIG. 22, the ductile stainless steel pipe may be provided as a bent pipe so that a ratio (E/F) of a maximum outer diameter (F) to a minimum outer diameter (E) is more than 0.85 and less than 1.

The ratio of the maximum and minimum outside diameters (E/F) is a conservatively estimated standard based on the standards of ASME (American Society of Mechanical Engineers) and JIS (Japanese Industrial Standards) (see Table 7).

Table 5 below shows setting criteria for the ratio of the maximum and minimum diameters.

TABLE 5

| ASME | (F-E) < 0.08 * D |
|---|---|
| JIS | When R > 4D, E > (2/3) * D |
| Setting Criteria | (E/F) > 0.85 |

In Table 5, D represents a value of the straight pipe (a reference pipe), and R represents a curvature radius.

Comparison of Bending Property of Ductile Stainless Steel Pipe, Copper Pipe, and Aluminum Pipe]

FIG. 23 illustrates results of testing the bending properties of the ductile stainless steel pipe satisfying the setting criteria (ratio of maximum and minimum outside diameters). In the bending property test, the ductile stainless steel pipe has a diameter Φ of 15.88 mm.

The bending represents bending downward or upward in a state in which the beam is bent when a load is applied. When the beam is bent downward, tensile force acts on the bottom portion, and when the beam is bent upward, compressive force acts on the bottom portion.

Referring to FIG. 23, force N applied to the aluminum pipe, the copper pipe, and the ductile stainless steel pipe according to the deformation length (mm), each of which has a pipe diameter Φ of 15.88 mm is illustrated.

When the minimum curvature radius Rmin is measured at the pipe having a diameter Φ of 15.88 mm, the copper pipe has a diameter of 85 mm, and the ductile stainless steel pipe has a diameter of 70 mm. Accordingly, since the ductile stainless steel pipe has a curvature radius R less than that of the copper pipe, it may be bent to be equal to or higher than that of the copper pipe.

Thus, since the ductile stainless steel pipe forms the curved pipe at a level equivalent to that of the copper pipe, the moldability may be improved when compared to the stainless steel pipe according to the related art. Here, the bending force of the worker is assumed to the maximum bending load of the copper pipe and the aluminum pipe. In this embodiment, the bending force of the worker may be 900 N.

In the graph of the bending property test result, the force N applied in the section of 0 mm to 2.5 mm of the deformation length may sharply increase, and then the force at the deformation length may gradually decrease in inclination to approach the maximum force N.

Also, in the graph of the bending property test result, the maximum bending load of the flexible stainless steel pipe may be 750 N, and the maximum bending load of each of the copper pipe and the aluminum pipe may be 900 N. That is, the maximum bending load of the ductile stainless steel pipe is less than that of the pipe according to the related art.

Therefore, the worker may form the ductile stainless steel pipe to be bent by using force within 83% of the maximum bending load of each of the copper pipe and the aluminum pipe. As a result, the worker may form the ductile stainless steel pipe to be bent by applying force less than that applied to form the copper pipe and the aluminum pipe to be bent.

In summary, the ductile stainless steel pipe according to an embodiment has an effect of improving the moldability when compared to the stainless steel pipe, the copper pipe and the aluminum pipe according to the related art. Therefore, the easy in the installation may be improved.

Figure 24:
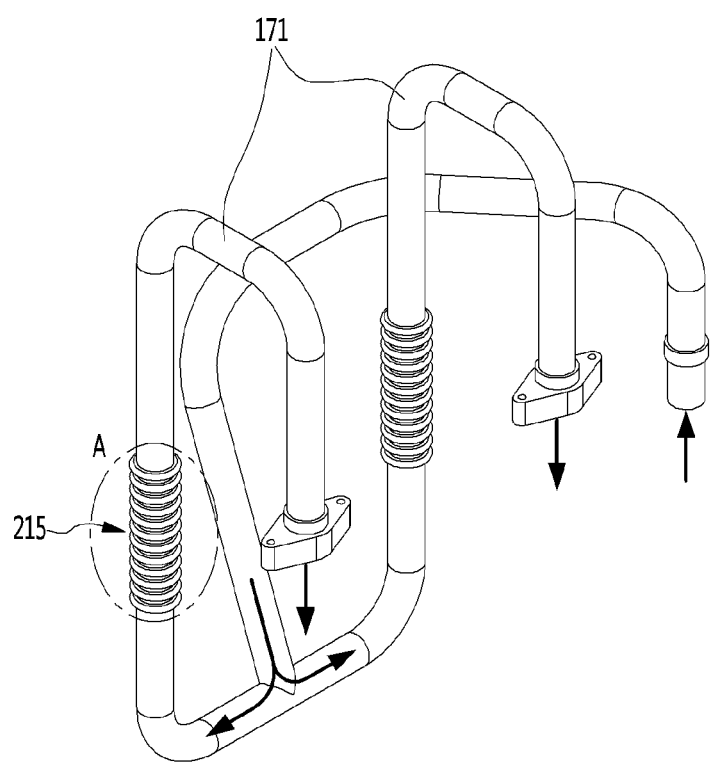
FIG. 24 is a perspective view of a suction pipe connected to a compressor constituting the gas heat pump according to an embodiment.
Figure 25:
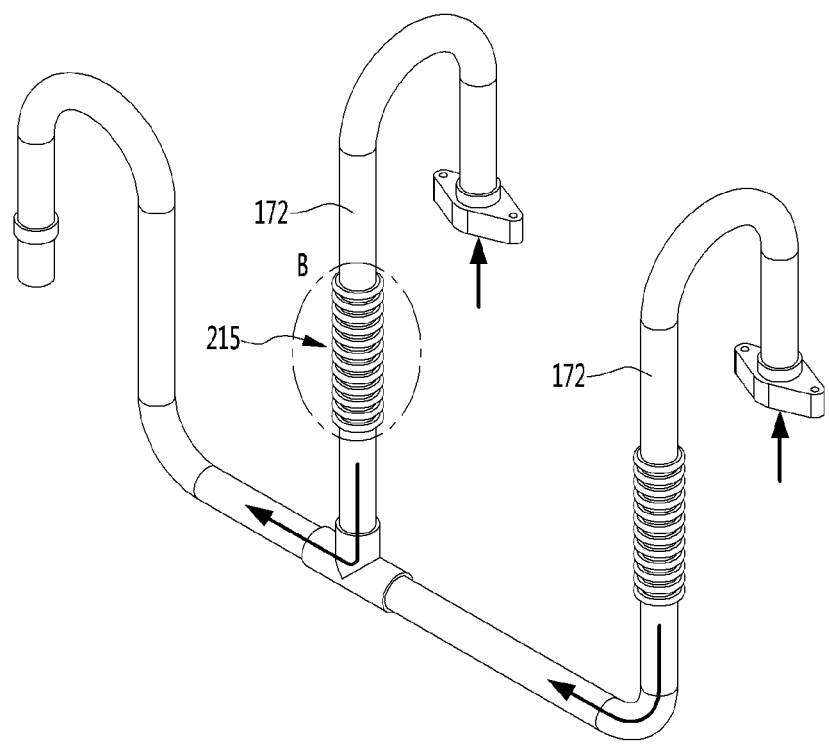
FIG. 25 is a perspective view of a discharge pipe connected to the compressor constituting the gas heat pump according to an embodiment.

FIG. 24 is a perspective view of the suction pipe connected to the compressor constituting the gas heat pump according to an embodiment, and FIG. 25 is a perspective view of the discharge pipe connected to the compressor constituting the gas heat pump according to an embodiment.

Referring to FIGS. 24 and 25, the suction pipe 171 is connected to the inlet side of the compressors 110 and 112, and the discharge pipe 172 is connected to the outlet side of the compressors 110 and 112.

In detail, when the two compressors 110 and 112 are installed, the compressors 110 and 112 may be divided into two suction pipes 171 at any point of the pipe extending from the gas/liquid separator 160 and may be connected to the inlet ports of the two compressors 110 and 112.

In addition, two discharge pipes 172 extending from the outlets of the two compressors 110 and 112 are combined and then connected to the condenser.

In addition, a wrinkle part 215 may be formed at any point of each of the suction pipe 171 and the discharge pipe 172. Hereinafter, the function and effect of the wrinkle part will be described.

Figure 26:
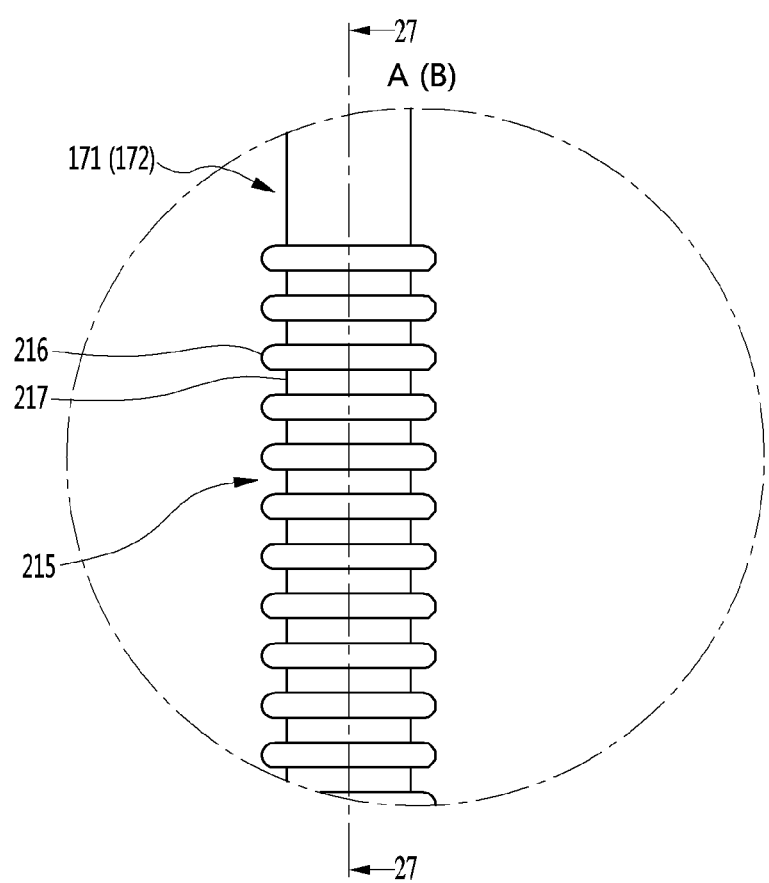
FIG. 26 is an enlarged perspective view of a portion A or B of FIG. 24 or 25.
Figure 27:
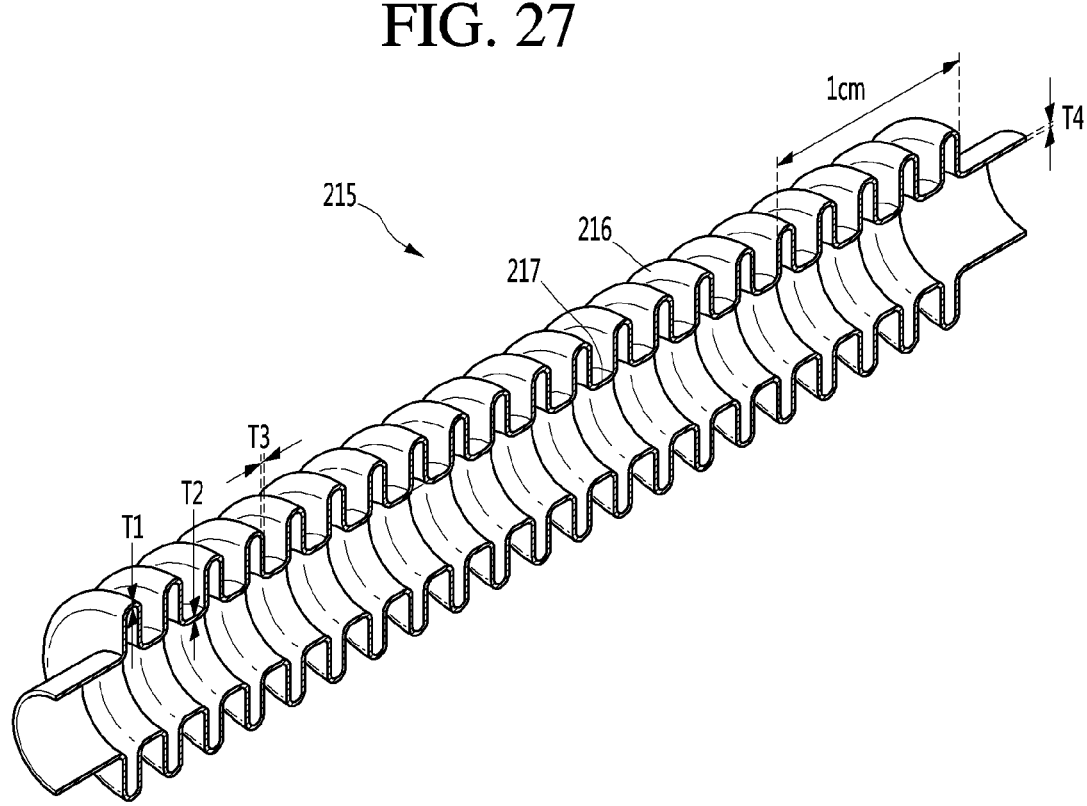
FIG. 27 is a cross-sectional view taken along line 27-27 of FIG. 26.

FIG. 26 is an enlarged perspective view of a portion A or B of FIG. 24 or 25, and FIG. 27 is a cross-sectional view taken along line 27-27 of FIG. 26.

Referring to FIGS. 26 and 27, since the suction pipe 171 and the discharge pipe 172 are made of stainless steel, the yield strength of the suction pipe 171 and the discharge pipe 172 is formed to be sufficiently higher than 200 N/mm². Therefore, even when the wrinkle part 215 is processed in the suction pipe 171 and the discharge pipe 172, there is no risk that the suction pipe 171 and the discharge pipe 172 may be damaged.

However, when the suction pipe 171 and the discharge pipe 172 are copper pipes, the yield strength of copper is formed to a small level of 70 N/mm² or less. Therefore, there is a problem that it is highly likely that the pipe will be damaged in the process of processing the wrinkle part.

In detail, the wrinkle part 215 includes mountain portions 216 and valley portions 217, which are repeatedly disposed alternately. The wrinkle part 215 enables elastic deformation of the pipe, thereby obtaining a vibration damping effect.

In detail, since the plurality of mountain portions 216 and the plurality of valley portions 217 are alternately disposed, the wrinkle part 215 may be bent by simply applying a relatively small external force. This is because each of the mountain portions 216 protrudes along a plane orthogonal to the length direction of the pipe to increase the surface area. For example, a technician can work to bend the wrinkle part 215 by holding the pipe with both hands and applying external force to reduce or increase the spacing between the plurality of mountain portions 216.

On the other hand, the pressure of the refrigerant flowing through the pipe is affected by the roughness of the inner circumferential surface of the pipe. As the inner circumferential surface is rougher, there are many resistance elements of the refrigerant flow. Therefore, the pressure drop of the refrigerant is increased and the vibration or noise is increased due to the increased resistance of the passage. On the other hand, as the inner circumferential surface is closer to the smooth surface, the pressure drop of the refrigerant is reduced and the vibration or noise is reduced.

The failure to maintain the accurate circle of the cross section inside the pipe means that many factors act as resistance to the refrigerant flow. When many factors act as the resistance to the refrigerant flow, it causes a pressure drop and noise generation of the refrigerant passing through the pipe.

Therefore, in order to alleviate the pressure drop and noise generation of the refrigerant, the cross section inside the pipe must maintain the accurate circle. Whether the cross section inside the pipe maintains the accurate circle may be evaluated by out-of-roughness. The out-of-roundness refers to the size deviating from the geometrically accurate circle, and refers to a measurement value representing how far all points present at the same distance from the center deviate from the accurate circle.

When the mountain 216 and the valley 217 have the same separation structure as the present disclosure, it is possible to minimize or suppress the change in out-of-roundness in the pipe even when an external force is applied to the wrinkle part 215 to bend the wrinkle part 215. Therefore, the change in out-of-roundness is relatively small in the inner circumferential surface of the bent wrinkles 215. The relatively small change in out-of-roughness means that the cross section inside the pipe has a shape close to the out-of-roughness, there is an effect that can reduce the pressure drop and noise generation of the refrigerant in the bent region of the pipe even when the wrinkle part 215 is bent to change the extension direction of the pipe.

For example, two to five mountains 216 may be formed per unit length (1 cm) along the length direction of the suction pipe 171 (or the discharge pipe 172). Since the valley 217 is formed between one mountain 216 and another mountain 216, one to four valleys 217 are formed when two to five mountains 216 are formed per unit length. However, the number of such mountains 216 and valleys 217 is merely one example, but the present disclosure is not limited thereto.

When the plurality of mountains 216 and the valleys 217 are more closely arranged, the flexibility of the pipe increases to increase the ease of bending work through external force, thereby further improving the effect of attenuating the transmission of vibration and noise.

The thickness of the pipe in the mountain 216 may be defined as T1, and the thickness of the pipe in the valley 217 may be defined as T2. The thickness of the pipe between the mountain 216 and the valley 217 may be determined as T3. The thickness of the pipe (defined as the pipe body) other than the wrinkle part 215 may be defined as T4. The thickness refers to a difference between the outer diameter and the inner diameter of the pipe. T4 may vary depending on design. However, due to the characteristics of the stainless steel material, sufficient rigidity may be obtained even by a thickness of 0.5 mm to 0.8 mm.

The pipe thicknesses T1, T2, and T3 of the wrinkle part 215 and the thickness T4 of the pipe body have a thickness difference of 0% to 5%. For example, when the thickness of the wrinkle part 215 is t, the thickness of the pipe body may have a thickness of 0.95 t to 1 t. The length of the pipe 210 may be shortened by hydroforming in the process of forming the wrinkle part 215 and the thickness thereof may be reduced. However, the difference within 5% means that the thickness of the wrinkle part 215 and the thickness of the pipe body are substantially constant. Since the substantially constant thickness means that there is almost no element acting as the resistance. Therefore, noise and pressure drop may be suppressed in the pipe.

T1, T2, and T3 also have a thickness difference in the range of 0% to 2%. This means that the thickness is substantially constant at each position of the wrinkle part 215. When the thickness is substantially constant at each position of the wrinkle part 215, the resistance formed on the inner circumferential surface of the wrinkle part 215 may be alleviated. Accordingly, the pressure drop of the refrigerant may be alleviated and the efficiency of the refrigeration cycle may also increase. Furthermore, the transmission of vibration and noise may also be attenuated. The reason why T1 to T4 can have the substantially constant thickness is that the wrinkle part 215 is integrally formed with the pipe body.

The invention claimed is:

1. A gas heat pump system comprising:
   an outdoor unit comprising a compressor, an outdoor heat exchanger, and an expansion device;
   an indoor unit comprising an indoor heat exchanger;
   a refrigerant pipe configured to connect the outdoor unit and the indoor unit so as to allow a refrigerant to circulate through the outdoor unit and the indoor unit;
   an engine configured to combust mixed fuel in which fuel and air are mixed so as to provide power for driving the compressor;
   a coolant tank configured to store a coolant for cooling the engine;
   a coolant pump configured to allow the coolant stored in the coolant tank to forcibly flow;
   a radiator configured to emit, to an outside, heat which is transferred from the engine to the coolant; and
   a coolant pipe configured to connect the coolant tank, the coolant pump, and the radiator so as to allow the coolant to circulate therethrough,
   wherein the gas heat pump system has a cooling capability between 71 kW and 85 kW,
   wherein a mixed refrigerant containing R32 of 50% or more is used as the refrigerant, and
   wherein the refrigerant pipe comprises a ductile stainless steel pipe having an austenite matrix structure of 99% or more and a delta ferrite matrix structure of 1% or less on the basis of a grain area,
   wherein the stainless steel comprises, percent by weight, C: 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: 0.03% or less, P: 0.04% or less, S: 0.04% or less, and N: 0.03% or less,
   wherein the stainless steel has a yield strength of 160 MPa, a tensile strength of 480 MPa, a hardness of 120 Hv, and an elongation of at least 60%.

2. The gas heat pump system according to claim 1, wherein a filling amount of the refrigerant is 10.5 kg.

3. The gas heat pump system according to claim 1, wherein the ductile stainless steel pipe has an austenite matrix structure and an average grain size of 30 μm to 60 μm, and
   an American Society for Testing and Material (ASTM) grain size No. of the ductile stainless steel pipe is 5.0 to 7.0.

4. The gas heat pump system according to claim 1, wherein the refrigerant pipe comprises a suction pipe configured to guide suction of the refrigerant to the compressor, and
   the suction pipe has an outer diameter of 25.40 mm and an inner diameter of 24.10 mm.

5. The gas heat pump system according to claim 4, wherein the suction pipe is provided with a wrinkle part, and
   the wrinkle part comprises a plurality of mountain portions and a plurality of valley portions, which are alternately disposed.

6. The gas heat pump system according to claim 1, wherein the refrigerant pipe comprises a discharge pipe configured to guide discharge of the refrigerant from the compressor, and
   the discharge pipe has an outer diameter of 19.05 mm and an inner diameter of 18.07 mm.

7. The gas heat pump system according to claim 6, wherein the discharge pipe is provided with a wrinkle part, and
   the wrinkle part comprises a plurality of mountain portions and a plurality of valley portions, which are alternately disposed.

8. The gas heat pump system according to claim 1, wherein the compressor is an inverter scroll compressor.

* * * * *